United States Patent
Oguchi

(10) Patent No.: US 9,743,457 B2
(45) Date of Patent: Aug. 22, 2017

(54) WIRELESS COMMUNICATION APPARATUS, WIRELESS BASE STATION, AND ABNORMALITY RESTORATION METHOD

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 13/245,414

(22) Filed: Sep. 26, 2011

(65) Prior Publication Data

US 2012/0076114 A1    Mar. 29, 2012

(30) Foreign Application Priority Data

Sep. 29, 2010   (JP) ................. 2010-219773

(51) Int. Cl.
H04W 36/00      (2009.01)
H04W 76/02      (2009.01)

(52) U.S. Cl.
CPC .......... *H04W 76/028* (2013.01); *H04W 36/00* (2013.01)

(58) Field of Classification Search
None
See application file for complete search history.

(56) References Cited

U.S. PATENT DOCUMENTS

| | | | |
|---|---|---|---|
| 6,704,573 B1 | 3/2004 | Paek et al. | |
| 8,155,075 B2* | 4/2012 | Kitamura | H04W 36/02 370/331 |
| 2004/0162071 A1* | 8/2004 | Grilli | H04L 12/185 455/435.1 |
| 2010/0246534 A1* | 9/2010 | Vargantwar | H04W 36/385 370/332 |
| 2012/0014308 A1* | 1/2012 | Li | H04W 24/02 370/312 |

FOREIGN PATENT DOCUMENTS

| | | |
|---|---|---|
| JP | 11-232194 A | 8/1999 |
| JP | 2000-148624 A | 5/2000 |
| JP | 2000-278206 A | 10/2000 |
| JP | 2010-35080 A | 2/2010 |
| JP | 2010-41648 | 2/2010 |
| WO | WO-2006/101370 | 9/2006 |

OTHER PUBLICATIONS

Japanese Office Action issued Mar. 4, 2014 for corresponding Japanese Patent Application No. 2010-219773, with Partial Translation, 5 pages.

* cited by examiner

*Primary Examiner* — Kouroush Mohebbi
(74) *Attorney, Agent, or Firm* — Fujitsu Patent Center

(57) ABSTRACT

A wireless communication apparatus attachable to an information processing apparatus. The wireless communication apparatus includes a wireless communication interface configured to perform wireless communication. The wireless communication apparatus also includes a processor configured to input, on detecting an error in the wireless communication interface, a signal for recognizing a temporary interruption to the information processing apparatus, and to initialize the wireless communication interface.

8 Claims, 16 Drawing Sheets

| BSID | CONNECTION PARAMETER | VALUE EXAMPLE |
|---|---|---|
| 0x0A0B01 | CENTER FREQUENCY | 2600[MHz] |
| | BANDWIDTH | 10[MHz] |
| | RECEIVED POWER | -20[dbm] |
| | NAP-ID | 7 |
| | NSP-ID | 22 |
| | DCD PARAMETER | ... |
| | UCD PARAMETER | ... |
| | RNG PARAMETER | ... |
| | SBC PARAMETER | ... |
| | PKM PARAMETER | ... |
| | REG PARAMETER | ... |
| 0x0A0B02 | CENTER FREQUENCY | 2610[MHz] |
| | BANDWIDTH | 10[MHz] |
| | RECEIVED POWER | -40[dbm] |
| | NAP-ID | - |
| | NSP-ID | - |
| | DCD PARAMETER | - |
| | UCD PARAMETER | - |
| | RNG PARAMETER | - |
| | SBC PARAMETER | - |
| | PKM PARAMETER | - |
| | REG PARAMETER | - |

FIG. 5

| FIELD NAME | FIELD LENGTH [Byte] | DESCRIPTION | VALUE EXAMPLE |
|---|---|---|---|
| MESSAGE TYPE | 4 | 0x1: DISCOVERY EXECUTION INSTRUCTION<br>0x2: ENTRY EXECUTION INSTRUCTION<br>0x3: RECEIVED-POWER REPORT INSTRUCTION<br>0x4: RECEIVED-POWER REPORT RESPONSE | 0x1 |
| Number of Frequencies | 4 | NUMBER OF CENTER FREQUENCIES TO BE SPECIFIED | 3 |
| CENTER FREQUENCY#1 | 4 | CENTER FREQUENCY OF SEARCH TARGET | 2600[MHz] |
| BANDWIDTH#1 | 4 | BANDWIDTH OF SEARCH TARGET | 10[MHz] |
| CENTER FREQUENCY#2 | 4 | CENTER FREQUENCY OF SEARCH TARGET | 2610[MHz] |
| BANDWIDTH#2 | 4 | BANDWIDTH OF SEARCH TARGET | 10[MHz] |
| CENTER FREQUENCY#3 | 4 | CENTER FREQUENCY OF SEARCH TARGET | 2620[MHz] |
| BANDWIDTH#3 | 4 | BANDWIDTH OF SEARCH TARGET | 10[MHz] |

FIG. 6

| FIELD NAME | FIELD LENGTH [Byte] | DESCRIPTION | VALUE EXAMPLE |
|---|---|---|---|
| MESSAGE TYPE | 4 | 0x1: DISCOVERY EXECUTION INSTRUCTION<br>0x2: ENTRY EXECUTION INSTRUCTION<br>0x3: RECEIVED-POWER REPORT INSTRUCTION<br>0x4: RECEIVED-POWER REPORT RESPONSE | 0x2 |
| CENTER FREQUENCY | 4 | CENTER FREQUENCY OF SEARCH TARGET | 2600[MHz] |
| BANDWIDTH | 4 | BANDWIDTH OF SEARCH TARGET | 10[MHz] |
| NAP-ID | 4 | IDENTIFICATION OF NAP TO BE CONNECTED | 7 |
| NSP-ID | 4 | IDENTIFICATION OF NSP TO BE CONNECTED | 9 |

FIG. 7

| FIELD NAME | FIELD LENGTH [Byte] | DESCRIPTION | VALUE EXAMPLE |
|---|---|---|---|
| MESSAGE TYPE | 4 | 0x1: DISCOVERY EXECUTION INSTRUCTION<br>0x2: ENTRY EXECUTION INSTRUCTION<br>0x3: RECEIVED-POWER REPORT INSTRUCTION<br>0x4: RECEIVED-POWER REPORT RESPONSE | 0x3 |
| REPORT-TARGET BS#1 | 4 | BSID OF BASE STATION TO BE REPORTED | 0x0A0B01 |
| REPORT METRIC#1 | 4 | ITEMS TO BE REPORTED<br>bit0: RSSI<br>bit1: CINR | 0x1 |
| REPORT-TARGET BS#2 | 4 | BSID OF BASE STATION TO BE REPORTED | 0x0A0B02 |
| REPORT METRIC#2 | 4 | ITEMS TO BE REPORTED<br>bit0: RSSI<br>bit1: CINR | 0x1 |

FIG. 8

| FIELD NAME | FIELD LENGTH [Byte] | DESCRIPTION | VALUE EXAMPLE |
|---|---|---|---|
| MESSAGE TYPE | 4 | 0x1: DISCOVERY EXECUTION INSTRUCTION<br>0x2: ENTRY EXECUTION INSTRUCTION<br>0x3: RECEIVED-POWER REPORT INSTRUCTION<br>0x4: RECEIVED-POWER REPORT RESPONSE | 0x4 |
| REPORT-TARGET BS#1 | 4 | BSID OF BASE STATION TO BE REPORTED | 0x0A0B01 |
| REPORT RESULT#1 | 4 | REPORT RESULT | -20[dbm] |
| REPORT-TARGET BS#2 | 4 | BSID OF BASE STATION TO BE REPORTED | 0x0A0B02 |
| REPORT RESULT#2 | 4 | REPORT RESULT | -40[dbm] |

FIG. 9

| FIELD NAME | DESCRIPTION | VALUE EXAMPLE |
|---|---|---|
| TRANSMISSION SOURCE | 0x1 = COMMUNICATION CONTROL UNIT | 0x1 |
| DESTINATION | 0x0 = CONNECTION MANAGEMENT UNIT | 0x0 |
| NOTIFICATION TYPE | 0x0: INITIALIZATION COMPLETION<br>0x1: DISCOVERY COMPLETION<br>0x2: CONNECTION (ENTRY) COMPLETION<br>0x3: IN PROCESS OF HO<br>0x4: IN PROCESS OF SCAN | 0x1 |
| Result TLV | ※VALUE IS SET IN THE FOLLOWING FIELDS ONLY WHEN Status = 0x1 | |
| NUMBER OF BSs | NUMBER OF BASE STATIONS DISCOVERED BY NETWORK DISCOVERY | 2 |
| BSID#1 | BSID OF BASE STATION DISCOVERED BY NETWORK DISCOVERY | 0x0A0B01 |
| NAP-ID#1 | NAP-ID OF RADIO ACCESS CARRIER TO WHICH BASE STATION DISCOVERED BY NETWORK DISCOVERY BELONGS | 7 |
| NSP-ID#1 | NSP-ID OF NSP CONNECTABLE FROM RADIO ACCESS CARRIER TO WHICH BASE STATION DISCOVERED BY NETWORK DISCOVERY BELONGS | 9 |
| CENTER FREQUENCY#1 | CENTER FREQUENCY OF BASE STATION DISCOVERED BY NETWORK DISCOVERY | 2600[MHz] |
| BANDWIDTH#1 | BANDWIDTH [MHz] OF BASE STATION DISCOVERED BY NETWORK DISCOVERY | 10[MHz] |
| BSID#2 | ... | 0x0A0B02 |
| NAP-ID#2 | ... | 7 |
| NSP-ID#2 | ... | 9 |
| CENTER FREQUENCY#2 | ... | 2610[MHz] |
| BANDWIDTH#2 | ... | 10[MHz] |

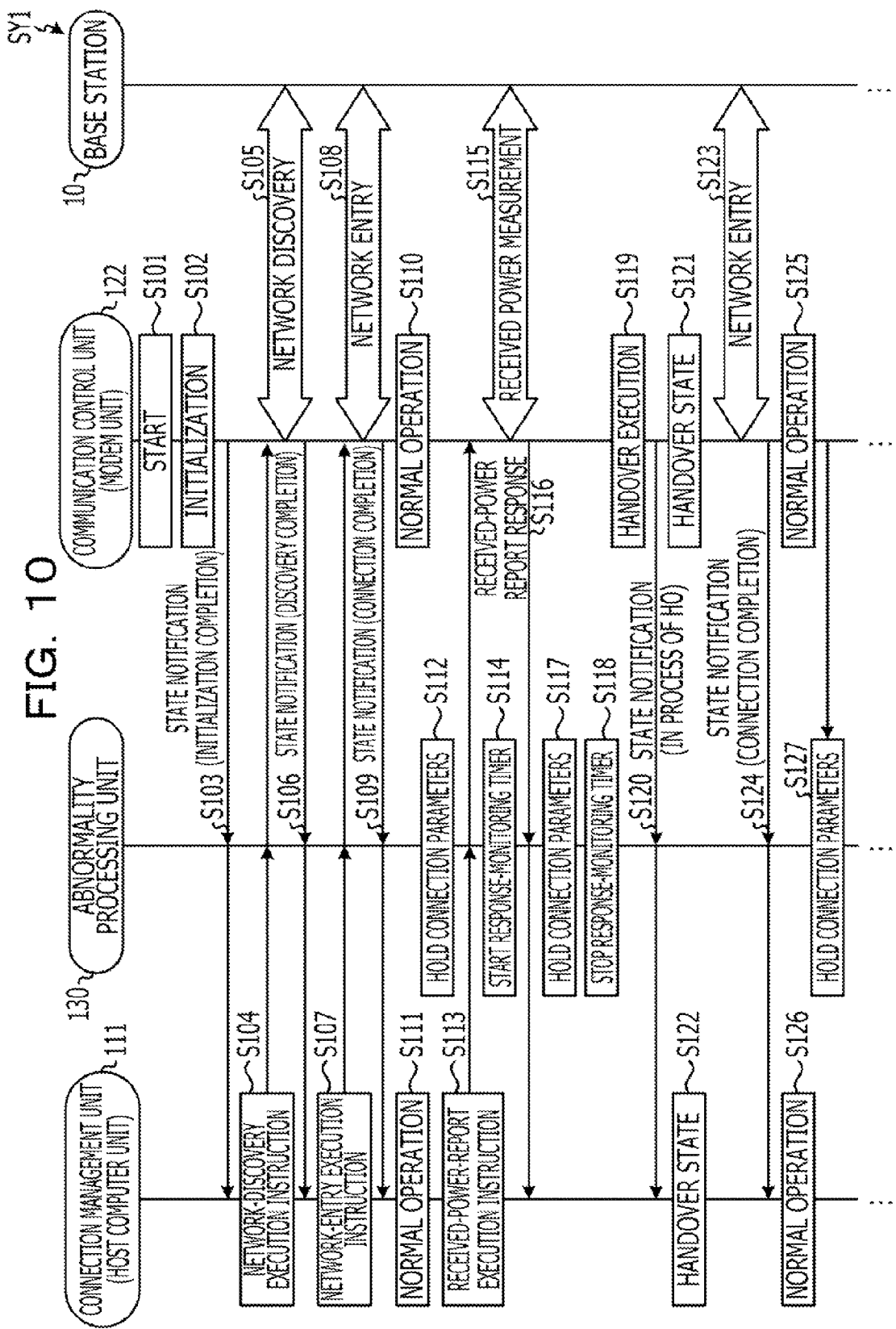

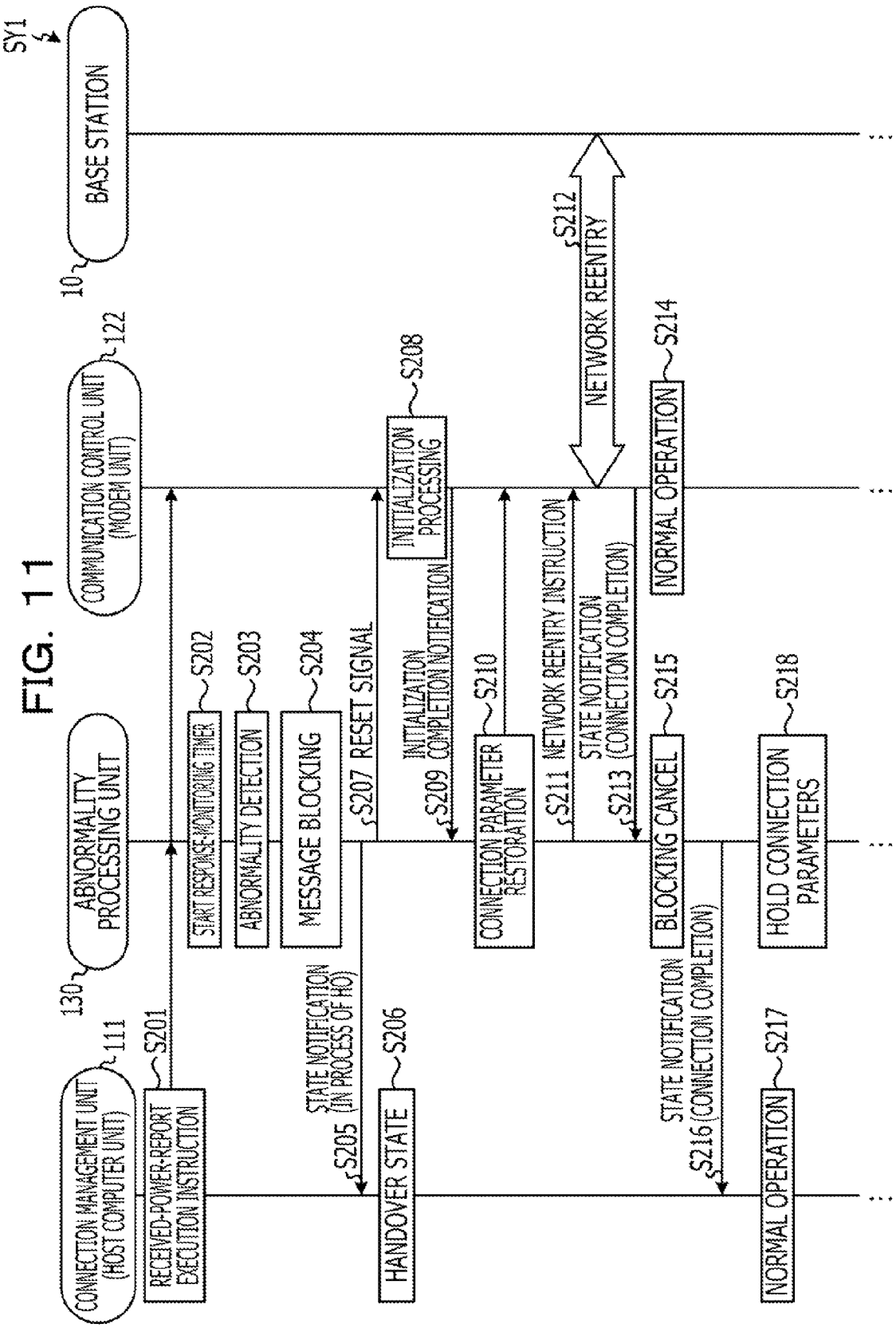

WIRELESS COMMUNICATION APPARATUS, WIRELESS BASE STATION, AND ABNORMALITY RESTORATION METHOD

CROSS-REFERENCE TO RELATED APPLICATION

This application is based upon and claims the benefit of priority from the prior Japanese Patent Application No. 2010-219773 filed on Sep. 29, 2010, the entire contents of which are incorporated herein by reference.

FIELD

The present invention relates to a wireless communication apparatus, a wireless base station, and an abnormality restoration method.

BACKGROUND

To date, wireless communication systems using wireless terminal apparatuses, base stations, etc., have been used. In recent years, wireless communication systems that are called wireless broadbands employing communication standards, such as WiMAX (Worldwide Interoperability for Microwave Access), LTE (Long Term Evolution), etc., have been known.

In general, wireless terminal apparatuses used in wireless communication systems have modems. The modems perform, for example, data transmission processing modulating a digital signal into a radio signal, and data receiving processing demodulating a received radio signal from a base station, etc., into a digital signal.

International Publication No. 2006/101370, Japanese Unexamined Patent Application Publication Nos. 2010-41648, 2000-278206, 2000-148624 and 11-232194 are examples of related art.

SUMMARY

According to an aspect of the invention, a wireless communication apparatus attachable to an information processing apparatus, the wireless communication apparatus including: a wireless communication interface configured to perform wireless communication; and a processor configured to input, on detecting an error in the wireless communication interface, a signal for recognizing a temporary interruption to the information processing apparatus; and to initialize the wireless communication interface.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a connection-parameter storage unit.

FIG. 5 is a diagram illustrating an example of a format of a network-discovery execution instruction.

FIG. 6 is a diagram illustrating an example of a format of a network-entry execution instruction.

FIG. 7 is a diagram illustrating an example of a format of a received-power-report execution instruction.

FIG. 8 is a diagram illustrating an example of a format of a received-power report response.

FIG. 9 is a diagram illustrating an example of a format of a state notification.

FIG. 10 is a sequence chart illustrating a processing procedure by the wireless communication system according to the first embodiment.

FIG. 11 is a sequence chart illustrating a processing procedure by the wireless communication system according to the first embodiment.

DESCRIPTION OF EMBODIMENTS

Figure 1:
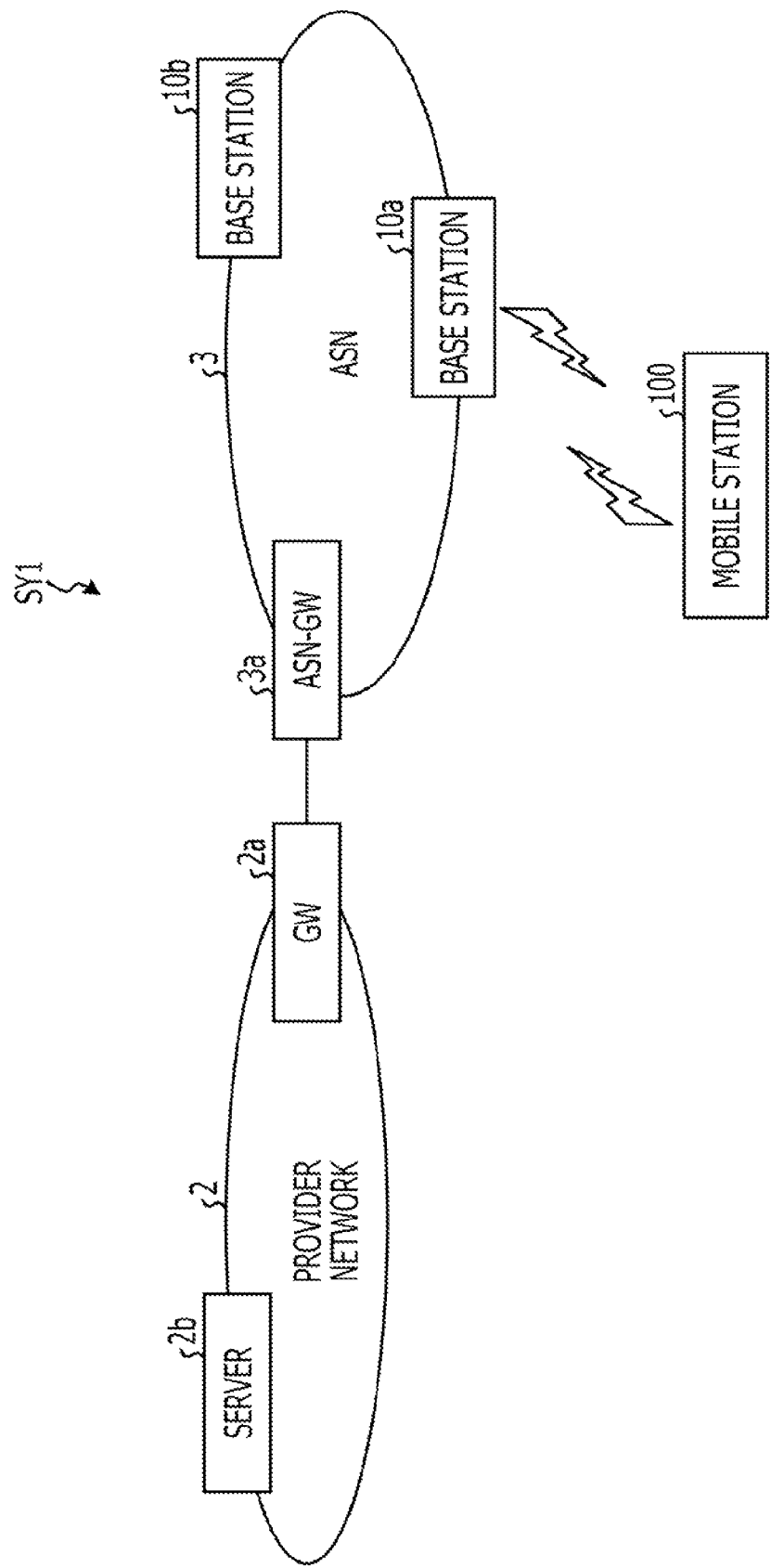
FIG. 1 is a diagram illustrating an example of a configuration of a wireless communication system according to a first embodiment.

There has been a problem in that in the above-described related-art wireless communication system, deterioration of availability of the system sometimes occurs. A description will be specifically given of this problem as follows.

A wireless terminal apparatus and a base station establish a connection, and then, for example, transmit and receive various control messages so that they manage mutual statuses, and maintain wireless communication. However, inconsistency sometimes occurs between the status of the wireless terminal apparatus and the status of the base station because of, for example, instability of the wireless communication. Such inconsistency occurs, for example, in the case where various control messages are not transmitted between the wireless terminal apparatus and the base station in correct sequence. When such inconsistency occurs, the wireless terminal apparatus sometimes reestablishes the connection with the base station by resetting a modem.

Here, the reset of the modem consists of initialization processing and network re-entry processing (network searching). The modem that is resetting performs initialization processing which consists of checking hardwares, loading programs, and setting parameter. Then the modem performs search processing for a base station capable of performing wireless communication with the wireless terminal apparatus, and performs establishment processing of a connection with a requested base station among searched base stations. In this manner, at the time of resetting a modem, a plurality of pieces of processing is performed by the modem so that it takes time until wireless communication is restarted between the wireless terminal apparatus and the base station. Also, when the wireless terminal apparatus resets a modem, the wireless terminal apparatus sometimes displays on a screen a message stating that the wireless communication has been interrupted so as to prompt a user to re-couple by the wireless communication. That is to say, the wireless terminal apparatus allows the user to recognize that the wireless communication has been interrupted. As described above, related-art wireless communication systems have a problem in that availability deteriorates when a modem is reset.

The disclosed technique has been made in view of the above-described problem. It is an object of the present invention to provide a wireless communication apparatus, a wireless terminal apparatus, a wireless base station, and an abnormality restoration method that does not cause deterioration of availability of the wireless communication when a modem is reset.

In the following, detailed descriptions will be given of a wireless communication apparatus, a wireless terminal apparatus, a wireless base station, and an abnormality restoration method disclosed in embodiments of the present invention with reference to the drawings. In this regard, a wireless communication apparatus, a wireless terminal apparatus, wireless base station, and an abnormality restoration method disclosed in the present invention will not be limited to the embodiments. For example, in the following embodiments, an example in which WiMAX is employed to a wireless communication system disclosed in the present invention. However, a wireless communication system disclosed in the present invention can be applied to the case where, for example, LTE is employed.

First Embodiment

Configuration of wireless communication system according to first embodiment

First, a description will be given of a wireless communication system according to a first embodiment using FIG. 1. FIG. 1 is a diagram illustrating an example of a configuration of a wireless communication system according to the first embodiment. It is assumed that WiMAX is applied to a wireless communication system SY1 shown in FIG. 1 as a communication standard. As shown in FIG. 1, the wireless communication system SY1 includes a provider network 2, an ASN (Access Service Network) 3, and a mobile station (MS) 100. In this regard, here, a mobile station is illustrated as a wireless terminal apparatus. However, a fixed terminal apparatus may be used as a wireless terminal apparatus.

The provider network 2 is, for example, a network provided by an ISP (Internet Services Provider). In the example shown in FIG. 1, a GW (Gateway) 2a and a sever 2b are disposed in the provider network 2.

The GW 2a passes data between the provider network 2 and a network other than the provider network 2. In the example illustrated in FIG. 1, the GW 2a is coupled to an ASN-GW (Access Service Network Gateway) 3a described later, and passes data between the provider network 2 and the ASN 3.

The server 2b provides various services. In the example shown in FIG. 1, server applications are running on the server 2b. The server applications include, for example, an FTP (File Transfer Protocol) server, and provide various services.

The ASN 3 is, for example, a network provided by a telecommunications carrier managing a wireless communication system of WiMAX, or the like. In the example illustrated in FIG. 1, an ASN-GW 3a and base stations (BS) 10a and 10b are disposed in the ASN 3.

The ASN-GW 3a passes data between the ASN 3 and a network other than the ASN 3. In the example illustrated in FIG. 1, the ASN-GW 3a is coupled to the GW 2a, and passes data between the ASN 3 and the provider network 2.

The base stations 10a and 10b form cells, respectively, which are wireless communication areas having a predetermined size, and perform wireless communication with the mobile station 100 located in the cell formed by the own station. In the example illustrated in FIG. 1, the base station 10a may perform wireless communication with a mobile station 100 positioned in a cell formed by the own station.

The mobile station 100 is, for example, a personal computer, a cellular phone, etc., and performs wireless communication with the base stations 10a or 10b. The mobile station 100 performs wireless communication with the base station 10a or 10b so as to receive various services provided by the server 2b.

The mobile station 100 like this has a modem performing wireless communication with the base station 10a. Such a modem transmits and receives, for example, various control messages with the base station 10a so as to establish a connection. Also, after the modem has established a connection with the base station 10a, the modem transmits and receives various control messages with the base station 10a so as to maintain wireless communication with the base station 10a.

However, inconsistency sometimes occurs between a state of the mobile station 100 and a state of the base station 10a. When such inconsistency occurs, the mobile station 100 determines that an abnormality occurs in processing by a modem, and thus resets the modem. In this regard, a "processing abnormality by a modem" mentioned here indicates, for example, a case where inconsistency occurs between a state of the mobile station 100 and a state of the base station, and represents an abnormality to be solved by resetting the modem. The "processing abnormality by a modem" may be caused, for example, by a state of firmware in a modem being frozen. In the following, a "processing abnormality by a modem" is sometimes expressed simply by a "modem abnormality".

Here, if an abnormality occurs in the modem in the mobile station 100 according to the first embodiment, the modem generates a signal for indicating a temporary interruption state. And when the modem reset has been completed, the modem generates a signal for indicating that the temporary interruption is over. Thereby, the mobile station 100 is allowed to reset the modem without considering an upper application's resetting the modem. Namely, the upper application terminates a communication session with the base station, and notifies the user that the wireless communication has been interrupted. For example, the upper application displays a message stating that the wireless communication has been interrupted to a display unit not shown in the figure. Thereby, the upper application prompts the user to perform restart operation of the wireless communication. Accordingly, it is possible to avoid a decrease in availability, which is caused by resetting the modem by the upper application. Also, when the mobile station 100 establishes a connection with the base station 10a before an abnormality occurs in the modem, the mobile station 100 holds various connection parameters used for establishing that connection. And when an abnormality occurs in the modem, the mobile station 100 establishes a connection with the base station 10a using the held various connection parameters after initialization of the modem. Thereby, the mobile station 100 is allowed to restart communication with the base station 10a in a short time.

Configuration of Base Station According to First Embodiment

Figure 2:
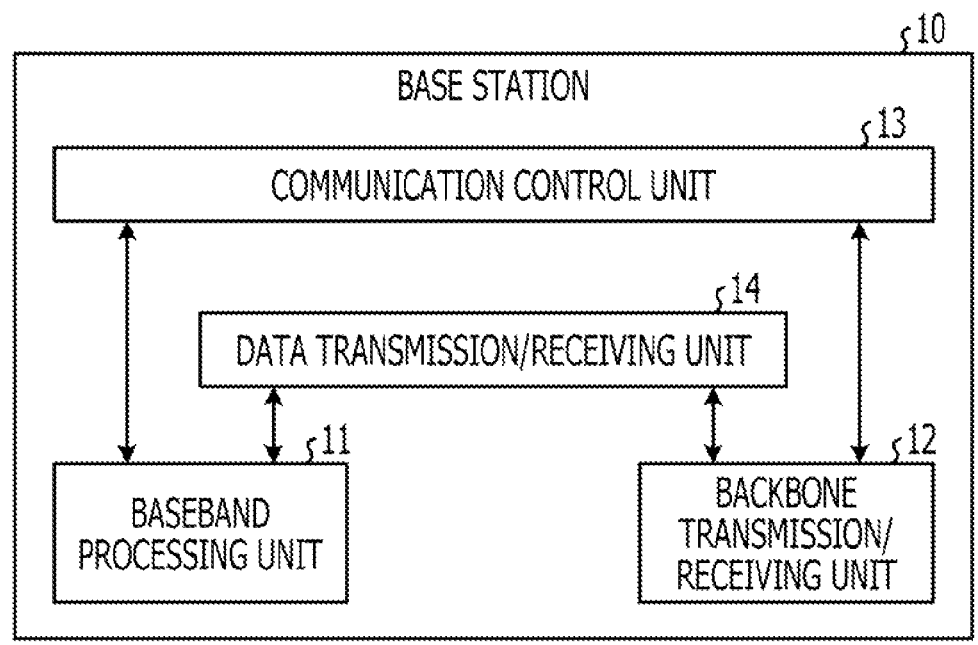
FIG. 2 is a diagram illustrating an example of a configuration of a base station according to the first embodiment.

Next, a description will be given of a base station according to the first embodiment using FIG. 2. FIG. 2 is a diagram illustrating an example of a configuration of the base station according to the first embodiment. The base station 10 shown in FIG. 2 corresponds to the base stations 10a and 10b shown in FIG. 1. As shown in FIG. 2, the base station 10 includes a baseband processing unit 11, a backbone transmission/receiving unit 12, a communication control unit 13, and a data transmission/receiving unit 14.

The baseband processing unit 11 performs baseband processing on a radio signal transmitted to and received from the mobile station 100. Specifically, the baseband processing unit 11 demodulates the radio signal received from the mobile station 100. And the baseband processing unit 11 outputs a control message included in a demodulated signal to the communication control unit 13, and outputs user data included in the demodulated signal to the data transmission/receiving unit 14. Also, the baseband processing unit 11 modulates control messages and user data input from the communication control unit 13 and the data transmission/receiving unit 14, and transmits a modulated radio signal to the outside through an antenna not shown in the figure.

The backbone transmission/receiving unit 12 transmits and receives various messages to and from the ASN-GW 3a and the other base stations through a backbone network. Specifically, the backbone transmission/receiving unit 12 outputs a control message received from the ASN-GW 3a and the other base stations to the communication control unit 13, and outputs user data received from the ASN-GW 3a and the other base station to the data transmission/receiving unit 14. Also, the backbone transmission/receiving unit 12 transmits a control message and user data input from the communication control unit 13 and the data transmission/receiving unit 14 to the ASN-GW 3a and the other base stations. In this regard, the backbone transmission/receiving unit 12 may be wiredly coupled or wirelessly coupled to the ASN-GW 3a and the other base station.

The communication control unit 13 transmits and receives control messages between the mobile station 100 and the ASN-GW 3a so as to control wireless communication with the mobile station 100. Specifically, the communication control unit 13 transmits and receives the control messages with the mobile station 100 through the baseband processing unit 11. Also, the communication control unit 13 transmits and receives control messages with the ASN-GW 3a and the other base stations through the backbone transmission/receiving unit 12.

The data transmission/receiving unit 14 transmits user data received from the mobile station 100 to another mobile station, and transmits user data received from another mobile station to the mobile station 100. For example, the data transmission/receiving unit 14 receives user data addressed to another mobile station from the mobile station 100 through the baseband processing unit 11. At this time, if a destination of the user data is a mobile station located in a cell formed by another base station, the data transmission/receiving unit 14 converts the user data into a packet format conforming to the backbone network. And the data transmission/receiving unit 14 transmits data packet that has been converted into the packet format to the other base station through the backbone transmission/receiving unit 12. Also, when the data transmission/receiving unit 14 receives data packet addressed to the mobile station 100 from the backbone transmission/receiving unit 12, the data transmission/receiving unit 14 converts the data packet into a radio frame format, and transmits the radio frame after the conversion to the mobile station 100.

Configuration of Mobile Station According to First Embodiment

Figure 3:
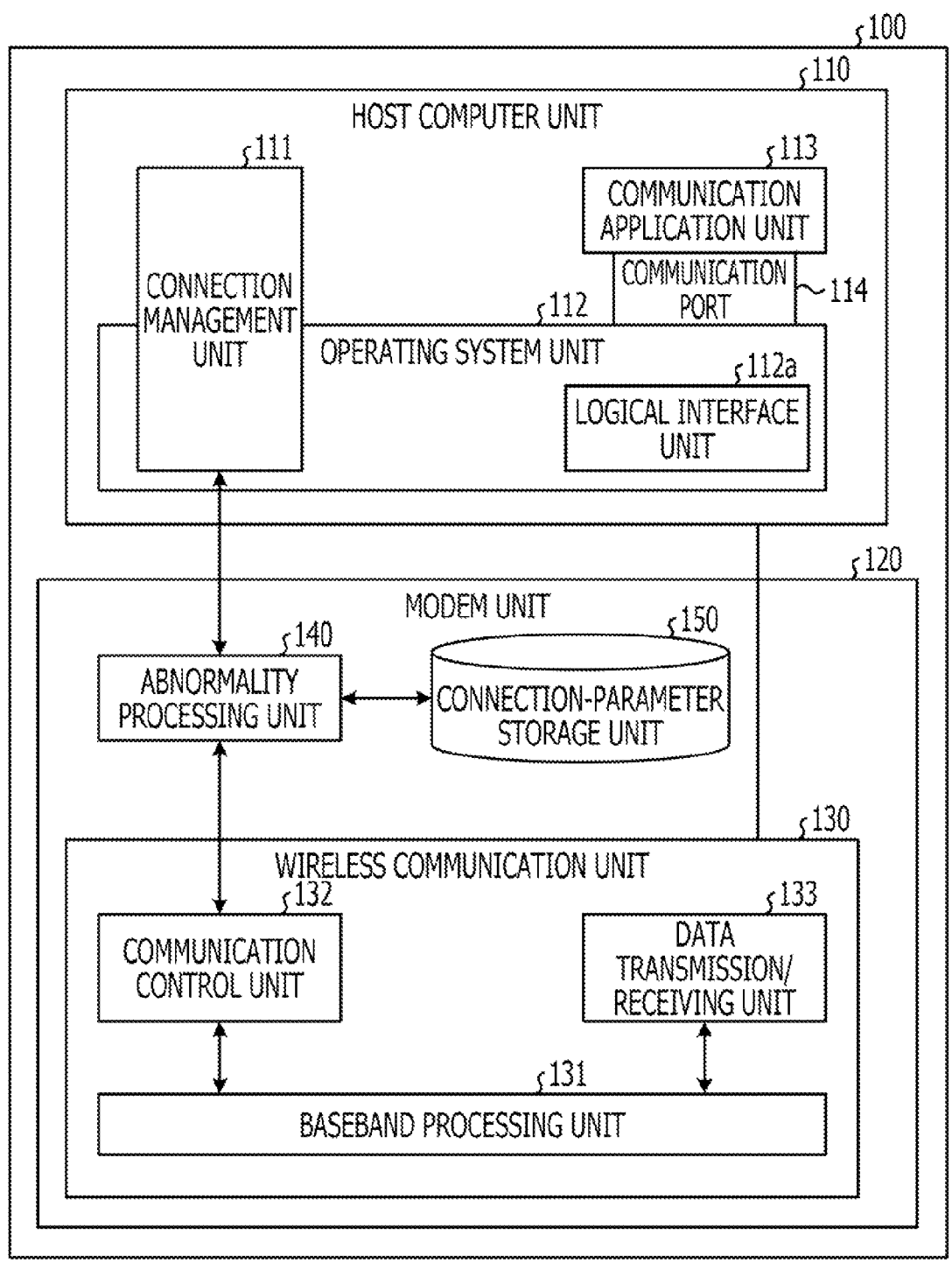
FIG. 3 is a diagram illustrating an example of a configuration of a mobile station according to the first embodiment.

Next, a description will be given of the mobile station 100 according to the first embodiment using FIG. 3. FIG. 3 is a diagram illustrating an example of a configuration of the mobile station 100 according to the first embodiment. As shown in FIG. 3, the mobile station 100 includes a host computer unit 110, and a modem unit 120. Also, the modem unit 120 includes a wireless communication unit 130, an abnormality processing unit 140, and a connection-parameter storage unit 150.

The host computer unit 110 is, for example, an information processing apparatus, such as a personal computer, a cellular phone, etc., and executes a communication application. As shown in FIG. 3, the host computer unit 110 includes a connection management unit 111, an operating system unit 112, and a communication application unit 113.

The connection management unit 111 controls the wireless communication unit 130 so as to manage a connection established between the wireless communication unit 130 and the base station 10. Thereby, the mobile station 100 starts and maintains wireless communication performed between the mobile station 100 and the base station 10. The connection management unit 111 is achieved, for example, in the form including a device driver corresponding to the modem unit 120, and a management application of the modem unit 120.

Specifically, when the connection management unit 111 starts wireless communication with the base station 10, the connection management unit 111 instructs the wireless communication unit 130 to search for a base station capable of performing wireless communication with the mobile station 100. At this time, the connection management unit 111 transmits one or more combinations of a center frequency and a bandwidth, or a predetermined frequency range to the wireless communication unit 130. In this regard, in the following, search processing for a base station is sometimes expressed as "network discovery".

Also, the connection management unit 111 selects a desired base station from the base stations searched by the network discovery. For example, the connection management unit 111 selects a base station that has transmitted a signal having a highest radio wave intensity measured by the wireless communication unit 130 among the searched base stations. Alternatively, the connection management unit 111 selects a base station that is providing a service used by a user among the searched base stations. And the connection management unit 111 instructs the wireless communication unit 130 to establish a connection with the selected base station. At this time, the connection management unit 111 transmits BSID (Base Station Identification), which is identification information for identifying a selected base station, to the wireless communication unit 130. In this regard, in the following, connection processing to the ASN 3 by establishing a connection to a base station is sometimes expressed as "network entry".

Also, after a connection is established between the wireless communication unit 130 and the base station, the connection management unit 111 instructs the wireless communication unit 130 to measure a radio wave intensity of a signal received from a neighboring base station located in the neighborhood of the mobile station 100. In this regard, in the following, processing for measuring a radio wave intensity of a signal received from a neighboring base station is sometimes expressed as a "received-power report".

Also, the connection management unit 111 instructs the wireless communication unit 130 to perform various kinds of processing on the wireless communication between the mobile station 100 and the base station in addition to the above-described processing. For example, the connection management unit 111 instructs the wireless communication unit 130 to set a service flow, etc.

In this regard, the connection management unit 111 according to the first embodiment transmits a network-discovery execution instruction, a network-entry execution instruction, and a received-power-report execution instruction, etc., to the communication control unit 132 of the wireless communication unit 130 through the abnormality processing unit 140. That is to say, the abnormality processing unit 140 performs relay processing on a network-discovery execution instruction, a network-entry execution instruction, and a received-power-report execution instruction, etc., transmitted by the connection management unit 111 to the communication control unit 132.

The operating system unit 112 provides the host computer unit 110 with an environment on which the communication application unit 113 runs. For example, the operating system unit 112 provides the communication application unit 113 with a function of accessing to the base station 10 through the wireless communication unit 130. As shown in FIG. 3, the operating system unit 112 has a logical interface unit 112*a*.

The logical interface unit 112*a* is a logical interface through which data is transmitted and received between the operating system unit 112 and the wireless communication unit 130. For example, the operating system unit 112 transmits data onto a communication link formed by the wireless communication unit 130 through the logical interface unit 112*a*. Also, the operating system unit 112 receives data from a communication link formed by the wireless communication unit 130 through the logical interface unit 112*a*.

The communication application unit 113 performs transmission and receiving of data with the base station 10 using a communication function provided by the operating system unit 112, and performs signal processing on the data. As shown in FIG. 3, the communication application unit 113 is coupled to the operating system unit 112 through a communication port 114. The communication port 114 is, for example, a socket, and is formed by the operating system unit 112 in association with the logical interface unit 112*a*.

Here, a brief description will be given of processing by the host computer unit 110. When wireless communication is started, the operating system unit 112 forms the logical interface unit 112*a* and the communication port 114 handling the wireless communication. And the connection management unit 111 controls the wireless communication unit 130 so as to establish a connection with a desired base station. By the formation of the communication port 114, the communication application unit 113 accesses the wireless communication unit 130 through the communication port 114 and the logical interface unit 112*a*. Thereby, the communication application unit 113 becomes possible to transmit and receive data between the base station through the wireless communication unit 130.

In this regard, when the wireless communication unit 130 is reset, the operating system unit 112 releases and forms the communication port 114 and the logical interface unit 112*a* again. That is to say, when the wireless communication unit 130 is reset, the communication application unit 113 becomes impossible to recognize the communication port 114 and the logical interface unit 112*a* even in the middle of transmitting and receiving data with the base station. In such a case, the communication application unit 113 terminates a communication session with the base station, and notifies the user that the wireless communication has been interrupted. For example, the communication application unit 113 displays a message stating that the wireless communication has been interrupted to a display unit not shown in the figure. Thereby, the communication application unit 113 prompts the user to perform restart operation of the wireless communication.

Next, as described above, the modem unit 120 includes the wireless communication unit 130, the abnormality processing unit 140, and the connection-parameter storage unit 150. The wireless communication unit 130 has a function corresponding to that of a related-art modem. The abnormality processing unit 140 and the connection-parameter storage unit 150 perform functions that are added in the present embodiment. The modem unit 120 is a unit providing the host computer unit 110 with a data communication function by radio waves. The modem unit 120 converts a digital signal into a radio signal, which is an analog signal, and transmits the signal. Also, the modem unit 120 converts a received radio signal into a digital signal. The modem unit 120 may be of a built-in type in the mobile station 100, or may be attached to the host computer unit 110 using a USB (Universal Serial Bus), etc. The wireless communication unit 130 is a communication unit performing wireless communication with the base station 10. Specifically, the wireless communication unit 130 modulates the digital signal generated by the host computer unit 110 into a radio signal, and transmits the modulated radio signal to the outside through an antenna not shown in the figure. Also, the wireless communication unit 130 demodulates a radio signal received by the antenna not shown in the figure into a digital signal so as to perform receiving processing.

As shown in FIG. 3, the wireless communication unit 130 like this includes a baseband processing unit 131, a communication control unit 132, and a data transmission/receiving unit 133. The baseband processing unit 131 synchronizes with a frame received from a base station 10 of the other end of communication, and performs baseband processing on the radio signal transmitted to and received from the base station 10. Specifically, the baseband processing unit 131 demodulates the radio signal received from the base station 10. And the baseband processing unit 131 outputs a control message included in the demodulated signal to the communication control unit 132, and outputs user data included in the demodulated signal to the data transmission/receiving unit 133. Also, the baseband processing unit 131 modulates a control message and user data input from the communication control unit 132 and the data transmission/receiving unit 133, and transmits the modulated radio signal to the outside through the antenna not shown in the figure.

The communication control unit 132 transmits and receives a control message to and from the base station 10 so as to establish a connection with the base station 10, and maintains the wireless communication between the base station 10. Specifically, when the communication control unit 132 receives various execution instructions from the connection management unit 111, the communication control unit 132 executes various kinds of processing in accordance with the execution instructions, and transmits a state notification indicating an execution results to the connection management unit 111.

For example, when wireless communication is started with the base station, the communication control unit 132 receives a network-discovery execution instruction from the connection management unit 111 through the abnormality processing unit 140. In such a case, the communication control unit 132 searches for a base station capable of performing wireless communication with the mobile station 100 on the basis of information, such as a center frequency, included in the network-discovery execution instruction. And after the network discovery is completed, the communication control unit 132 transmits a discovery completion notification including an execution result of the network discovery to the connection management unit 111 as a state notification.

Also, for example, when the communication control unit 132 receives a network-entry execution instruction from the connection management unit 111 through the abnormality processing unit 140, the communication control unit 132 establishes a connection with a base station indicated by a BSID included in the network-entry execution instruction. And the communication control unit 132 transmits a connection completion notification including an execution result of the network entry to the connection management unit 111 as a state notification.

Here, a description will be specifically given of network entry performed by the communication control unit 132. Here, it is assumed that the communication control unit 132 performs network entry so as to establish a connection with the base station 10. First, the communication control unit 132 receives a DL-MAP (Downlink MAP) message and an UL-MAP (Uplink MAP) message from the base station 10. Thereby, the communication control unit 132 obtains mapping information of a sub-frame. Next, the communication control unit 132 receives a DCD (Downlink Channel Descriptor) message and an UCD (Uplink Channel Descriptor) message from the base station 10. Thereby, the communication control unit 132 obtains various system parameters.

Next, the communication control unit 132 transmits and receives an RNG-REQ (Ranging Request) message and an RNG-RSP (Ranging Response) message with the base station 10. Next, the communication control unit 132 transmits and receives an SBC-REQ (SS Basic Capability Request) message and an SBC-RSP (SS Basic Capability Response) message with the base station 10. Next, the communication control unit 132 transmits and receives a PKM-REQ (Privacy Key Management Request) message and a PKM-RSP (Privacy Key Management Response) message. Next, the communication control unit 132 transmits and receives an REG-REQ (Registration Request) message and an REG-RSP (Registration Response) message.

In this regard, there are messages that are not transmitted and received between the mobile station 100 and the base station 10 depending on specification of the wireless communication system SY1 among the above-described messages. For example, if the wireless communication system SY1 specifies that authentication is not necessary, the mobile station 100 and the base station 10 will not transmit and receive the PKM-REQ message and the PKM-RSP message.

Also, for example, when the communication control unit 132 receives a received-power-report execution instruction from the connection management unit 111 through the abnormality processing unit 140, the communication control unit 132 measures a radio wave intensity of a signal received from a neighboring base station. And the communication control unit 132 transmits a received-power-report response including a measurement result of the radio wave intensity to the connection management unit 111 as a state notification.

At this time, the communication control unit 132 performs handover (HO) depending on the measurement result of the radio wave intensity. In this regard, the handover is also called "network re-entry". The network re-entry is a procedure that is a simplified procedure of network entry, and, for example, is sometimes completed by transmitting and receiving an RNG-REQ message and an RNG-RSP message with the base station.

The data transmission/receiving unit 133 transmits and receives user data to and from the base station 10. Specifically, the data transmission/receiving unit 133 converts user data received from the host computer unit 110 into a radio frame format, and transmits a converted radio frame to the base station 10 through the baseband processing unit 131. Also, the data transmission/receiving unit 133 extracts user data from a demodulated frame that is input from the baseband processing unit 131, and transmits the extracted user data to the host computer unit 110.

When an abnormality occurs in the processing by the wireless communication unit 130, the abnormality processing unit 140 stops the connection management unit 111 from controlling the wireless communication unit 130. And after the abnormality processing unit 140 initializes the wireless communication unit 130, the abnormality processing unit 140 controls the wireless communication unit 130 in order to establish a connection with the base station using the connection information stored in the connection-parameter storage unit 150.

Specifically, the abnormality processing unit 140 stores various connection parameters included in various execution instructions and messages transmitted and received between the connection management unit 111 and the communication control unit 132 into the connection-parameter storage unit 150. For example, the abnormality processing unit 140 stores the connection parameters used at the time of establishing a connection with the base station into the connection-parameter storage unit 150.

Also, the abnormality processing unit 140 monitors the wireless communication unit 130, and if the abnormality processing unit 140 detects the occurrence of an abnormality in the wireless communication unit 130, the abnormality processing unit 140 notifies the connection management unit 111 that the wireless communication unit 130 is normal, but is in a state unable to be used temporarily. That is to say, even if an abnormality occurs in the wireless communication unit 130, the abnormality processing unit 140 conceals from the connection management unit 111 that the wireless communication unit 130 is abnormal. Thereby, the abnormality processing unit 140 stops the connection management unit 111 from controlling the wireless communication unit 130.

For example, the abnormality processing unit 140 notifies the connection management unit 111 that the wireless communication unit 130 is executing handover although the wireless communication unit 130 is not executing handover in reality. Thereby, the abnormality processing unit 140 can notify the connection management unit 111 that the wireless communication unit 130 is temporarily unable to be used. Alternatively, for example, the abnormality processing unit 140 notifies the connection management unit 111 that the wireless communication unit 130 is performing scan processing although the wireless communication unit 130 is not executing the scan processing for measuring a radio wave intensity of a received signal. Thereby, the abnormality processing unit 140 can notify the connection management unit 111 that the wireless communication unit 130 is temporarily unable to be used.

That is to say, since an abnormality of the wireless communication unit 130 is concealed, even if an abnormality occurs in the wireless communication unit 130, the connection management unit 111 according to the first embodiment determines that the wireless communication unit 130 is normal. Thereby, even if an abnormality occurs in the wireless communication unit 130, the connection management unit 111 does not give an initialization instruction, a network-discovery execution instruction, or a network-entry execution instruction to the wireless communication unit 130. Also, the connection management unit 111 receives a notification that the wireless communication unit 130 is temporarily unable to be used, and thus the connection management unit 111 stops transmitting message including the user data to the data transmission/receiving unit 133 of the wireless communication unit 130. At this time, the host computer unit 110, for example, buffers the data to be transmitted to the wireless communication unit 130.

Also, when an abnormality occurs in processing by the wireless communication unit 130, the abnormality processing unit 140 does not relay various execution instructions transmitted and received between the connection management unit 111 and the communication control unit 132. In the following, a state of the abnormality processing unit 140, in which various execution instructions are not relayed, is sometimes expressed as a "blocking mode".

And the abnormality processing unit 140 transmits a reset signal to the wireless communication unit 130 in place of the connection management unit 111 so as to initialize the wireless communication unit 130. In this regard, the abnormality processing unit 140 may obtain the connection parameters held by the communication control unit 132 before transmitting a reset signal to the wireless communication unit 130, and may overwrite the obtained connection parameters into the connection-parameter storage unit 150.

And the abnormality processing unit 140 transmits the various connection parameters stored in the connection-parameter storage unit 150 to the wireless communication unit 130, and instructs the wireless communication unit 130 to perform network reentry using these connection parameters. That is to say, the abnormality processing unit 140 instructs the wireless communication unit 130 to perform same processing as that at the time of handover using the connection parameters in the connection-parameter storage unit 150. In this case, in order to perform network reentry, it is necessary for the base station 10 to hold the connection parameters of the mobile station 100. The network entry which takes much time than network reentry may be performed in the case where the base station 10 is determined not to hold the connection parameters.

And when the wireless communication unit 130 has completed network reentry, the abnormality processing unit 140 cancels the blocking mode, and relays various execution instructions transmitted and received between the connection management unit 111 and the communication control unit 132.

In this manner, even if the wireless communication unit 130 has detected an abnormality, the mobile station 100 restarts communication by network reentry. Thereby, the mobile station 100 can re-couple with the base station without performing network discovery, and thus it is possible to restart communication with the base station in a short time. As a result, the mobile station 100 can improve availability of the wireless communication.

The connection-parameter storage unit 150 stores the connection parameters on the connection established between the wireless communication unit 130 and the base station. For example, when the communication control unit 132 performs network discovery, network entry, network reentry, and received-power report, the wireless communication unit 130 and the abnormality processing unit 140 store various connection parameters into the connection-parameter storage unit 150. The connection-parameter storage unit 150 like this employs a storage area, such as a flash memory, etc., which is not cleared even if the wireless communication unit 130 is reset.

FIG. 4 illustrates an example of the connection-parameter storage unit 150. As shown in FIG. 4, the connection-parameter storage unit 150 has items, such as "BSID", and "connection parameters". In this regard, in the example shown in FIG. 4, an example of a value stored in the "connection parameters" is shown in "value example".

"BSID" is identification information identifying the base station 10. In the example shown in FIG. 4, a value of 24 bits is stored in BSID. Here, a 24-bit BSID is identification information enabling a base station to be uniquely identified in a same ASN. On the other hand, although not shown in FIG. 4, a 48-bit BSID is identification information enabling a plurality of base stations included in different ASNs to be uniquely identified. In this regard, in the example shown in FIG. 4, BSID "0×0A0B01" is a BSID of the base station 10a shown in FIG. 1, and BSID "0×0A0B02" is a BSID of the base station 10b shown in FIG. 1.

"Connection parameter" shows various connection parameters obtained by network discovery, network entry, etc. As shown in FIG. 4, the connection-parameter storage unit 150 stores information, such as "center frequency", "bandwidth", "received power", "NAP (Network Access Provider)-ID", and "NSP (Network Service Provider)-ID" as the "connection parameters".

The "center frequency" shows a frequency used when the mobile station 100 performs wireless communication with the base station. The "bandwidth" shows a bandwidth of a frequency band used when performing wireless communication with the base station. The "received power" shows a radio wave intensity of a signal received from a base station. The "NAP-ID" is identification information identifying a NAP that is a wireless access carrier. The "NSP-ID" is identification information identifying an NSP providing an Internet access through the wireless access carrier.

In the example shown in FIG. 4, it is shown that the base station 10a having a BSID of "0×0A0B01" performs wireless communication with a center frequency of "2600 [MHz]", and a bandwidth of "10 [MHz]". Also, in the example shown in FIG. 4, it is shown that the base station 10b having a BSID of "0×0A0B02" performs wireless communication with a center frequency of "2610 [MHz]", and a bandwidth of "10 [MHz]".

Also, in the example shown in FIG. 4, it is shown that when the mobile station received a signal transmitted from the base station 10a having a BSID of "0×0A0B01", a radio wave intensity of the received signal is "−20 [dbm]". Also, in the example shown in FIG. 4, it is shown that when the mobile station received a signal transmitted from the base station 10b having a BSID of "0×0A0B02", a radio wave intensity of the received signal is "−40 [dbm]".

Also, as shown in FIG. 4, the connection-parameter storage unit 150 stores information, such as "DCD parameter", "UCD parameter", "RNG parameter", "SBC parameter", "PKM parameter", and "REG parameter".

The "DCD parameter" indicates various kinds of information in a DCD message received from a base station at the time of network entry. The "UCD parameter" indicates various kinds of information included in a UCD message received from a base station at the time of network entry. The "RNG parameter" indicates various kinds of information included in an RNG-RSP message transmitted and received with the base station at the time of network entry.

The "SBC parameter" indicates various kinds of information in an SBC-RSP message transmitted and received with the base station at the time of network entry. The "PKM parameter" indicates various kinds of information included in a PKM-REQ message and a PKM-RSP message network entry transmitted and received with the base station at the time of network entry. The "REG parameter" indicates various kinds of information included in an REG-RSP message transmitted and received with the base station at the time of network entry.

In this regard, various connection parameters stored in the connection-parameter storage unit 150 are overwritten with latest information by the wireless communication unit 130 and the abnormality processing unit 140. For example, the mobile station 100 and the base station 10 sometimes receive an RNG-REQ message and an RNG-RSP message a plurality of times. In such a case, the wireless communication unit 130 and the abnormality processing unit 140 store various kinds of information included in a latest RNG-RSP message that has been used for establishing and maintaining a connection into the "RNG parameter" of the connection-parameter storage unit 150.

Data Format

Next, descriptions will be given of formats of various kinds of data transmitted and received among the connection management unit 111, the abnormality processing unit 140, and the communication control unit 132 using FIGS. 5 to 9. FIG. 5 is a diagram illustrating an example of a format of a network-discovery execution instruction. As shown in FIG. 5, the network-discovery execution instruction includes "message type", "number of frequencies", "center frequency #N (N is a positive number, and this also applies to the following)", "bandwidth#N". In this regard, "field length" shown in FIG. 5 indicates a size (byte) of the information stored in a corresponding field name. Also, "value example" shown in FIG. 5 indicates an example of a value set in various fields.

The "message type" indicates a type of execution instruction transmitted from the connection management unit 111 and the abnormality processing unit 140 to the communication control unit 132. Here, if "0x1" is stored in the "message type", it indicates that the execution instruction is a network-discovery execution instruction. Also, if "0x2" is stored in the "message type", it indicates that the execution instruction is a network-entry execution instruction. Also, if "0x3" is stored in the "message type", it indicates that the execution instruction is a received-power-report execution instruction. Also, if "0x4" is stored in the "message type", it indicates that the execution instruction is a received-power-report response transmitted from the communication control unit 132 to the abnormality processing unit 140. In this regard, the execution instruction shown in FIG. 5 indicates a network-discovery execution instruction, and thus "0x1" is stored in the "message type".

The "number of frequencies" indicates the number of combinations of a center frequency and a bandwidth that become an execution target of a network discovery. As shown by the "value example" in FIG. 5, if the "number of frequencies" is "3", it indicates that three combinations of a center frequency and a bandwidth to be an execution target of network discovery are included.

The "center frequency#N" indicates a center frequency of a frequency band to be an execution target of network discovery. Also, the "bandwidth#N" indicates a bandwidth of a frequency band to be an execution target of network discovery. In this regard, in the example shown in FIG. 5, the "center frequency#N" and the "bandwidth#N" that have a same number "N" are assumed to be related. For example, the "center frequency#1" and the "bandwidth#1" are related, the "center frequency #2" and the "bandwidth #2" are related, and the "center frequency #3" and the "bandwidth #3" are related.

When a "value example" is set in the various kinds of information exemplified in FIG. 5, the network-discovery execution instruction exemplified in FIG. 5 indicates that network discovery is performed for combinations of the center frequency and the bandwidth that are shown as follows.

center frequency: 2600 [MHz] and bandwidth: 10 [MHz]
center frequency: 2610 [MHz] and bandwidth: 10 [MHz]
center frequency: 2620 [MHz] and bandwidth: 10 [MHz]

FIG. 6 is a diagram illustrating an example of a format of a network-entry execution instruction. As shown in FIG. 6, the network-entry execution instruction includes information, such as "message type", "center frequency", "bandwidth", "NAP-ID", and "NSP-ID". In this regard, the "field length" shown in FIG. 6 indicates a size (byte) of information stored in a corresponding field name. Also, the "value example" shown in FIG. 6 indicates an example of a value set in various kinds of information.

The "message type" is the same as the message type shown in FIG. 5. In this regard, the execution instruction shown in FIG. 6 indicates a network-entry execution instruction, and thus "0x2" is stored in the "message type".

The "center frequency" indicates a center frequency of a frequency band to be an execution target of the network entry. Also, the "bandwidth" indicates a bandwidth of a frequency band to be an execution target of the network entry. The "NAP-ID" is identification information for identifying a connection-target NAP. The "NSP-ID" is identification information for identifying the connection-target NSP.

FIG. 7 is a diagram illustrating an example of a format of a received-power-report execution instruction. As shown in FIG. 7, the received-power-report execution instruction includes information, such as "message type", "report-target BS#N", and "report metric#N". In this regard, the "field length" shown in FIG. 7 indicates a size (byte) of information stored in a corresponding field name. Also, the "value example" shown in FIG. 7 indicates an example of a value set in various kinds of information.

The "message type" is the same as the message type shown in FIG. 5. In this regard, the execution instruction shown in FIG. 7 indicates a received-power-report execution instruction, and thus "0x3" is stored in the "message type".

The "report-target BS#N" indicates a BSID identifying a base station of the received-power-report execution target. The "report metric#N" indicates a type of information obtained by a received-power report execution. For example, information indicating an RSSI (Received Signal Strength Indication) and a CINR (Carrier to Interference plus Noise Ratio) is stored in the "report metric#N". In the example shown in FIG. 7, if a 0-th bit of the "report metric#N" is "1", it is indicated that the report-target item is an RSSI, and if the 0-th bit is "0", the report-target item is not an RSSI. Also, if a first bit of the "report metric#N" is "1", it is indicated that the report-target item is CINR, and if the first bit is "0", the report-target item is not CINR. For example, if the 0-th bit of the "report metric#N" is "1", and the first bit is "1", the report-target item is an RSSI and CINR.

In this regard, in the example shown in FIG. 7, the "report-target BS#N" and the "report metric#N" that have a same number "N" are assumed to be related. For example, the "report-target BS#1" and the "report metric#1" are related, and the "report-target BS#2" and the "report metric#2" are related.

FIG. 8 is a diagram illustrating an example of a format of a received-power report response transmitted by the communication control unit 132. As shown in FIG. 8, the received-power report response includes information, such as "message type", "report-target BS#N", and "report result#N". In this regard, the "field length" shown in FIG. 8 indicates a size (byte) of information stored in a corresponding field name. Also, the "value example" shown in FIG. 8 indicates an example of a value set in various kinds of information.

The "message type" is the same as the message type shown in FIG. 5. In this regard, the state notification shown in FIG. 8 indicates a received-power report response, and thus "0×4" is stored in the "message type".

The "report-target BS#N" indicates a BSID identifying a base station of the received-power-report execution target. The "report result#N" indicates an execution result of a received-power report. For example, if RSSI is set in the "report metric" of the received-power-report execution instruction shown in FIG. 7, the wireless communication unit 130 obtains the RSSI, and set it in the "report result#N".

In this regard, in the example shown in FIG. 8, the "report-target BS#N" and the "report result#N" that have a same number "N" are assumed to be related. For example, the "report-target BS#1" and the "report result#1" are related, and the "report-target BS#2" and the "report result#2" are related.

FIG. 9 illustrates an example of a format of a state notification transmitted by the communication control unit 132. As shown in FIG. 9, the state notification includes information, such as "transmission source", "destination", "notification type", "number of BSs", "BSID#N", "NAP-ID#N", "NSP-ID#N", "center frequency#N", and "bandwidth#N".

The "transmission source" is identification information identifying a transmission source of a state notification. The "destination" is identification information identifying a destination of a state notification. In this regard, here, it is assumed that information identifying the connection management unit 111 is "0×0", and information identifying the communication control unit 132 is "0×1". That is to say, the state notification shown in FIG. 9 is transmitted by the communication control unit 132 to the connection management unit 111, and thus "0×1" indicating the communication control unit 132 is stored in the "transmission source", and "0×0" indicating the connection management unit 111 is stored in the "destination".

The "notification type" indicates a type of state notification. Here, if "0×0" is stored in the "notification type", the type of the state notification is an initialization completion notification indicating that the initialization processing of the wireless communication unit 130 has been completed. Also, if "0×1" is stored in the "notification type", the type of the state notification is network discovery indicating that the network discovery has been completed. Also, if "0×2" is stored in the "notification type", a type of the state notification is a connection completion notification indicating that network entry has been completed. Also, if "0×3" is stored in the "notification type", a type of the state notification is an in-process-of HO notification indicating that the wireless communication unit 130 is in process of handover processing. Also, if "0×4" is stored in the "notification type", a type of the state notification is an in-process-of scan notification indicating that the wireless communication unit 130 is in the process of measuring a received power.

In this regard, information of "Result TLV" and thereafter, shown in FIG. 9, is set in the case of a discovery completion notification, that is to say, when "0×1" is set in the "notification type". That is to say, information is set in "number of BSs", "BSID#N", "NAP-ID#N", "NSP-ID#N", "center frequency#N", and "bandwidth#N" in the case of a discovery completion notification.

The "number of BSs" indicates the number of base stations discovered by network discovery by the communication control unit 132. The "BSID#N" indicates a BSID of a base station discovered by the network discovery. The "NAP-ID#N" indicates an NAP-ID of a wireless access carrier to which the base station discovered by the network discovery belongs. The "NSP-ID#N" indicates an NSP-ID of an NSP capable of being coupled from the wireless access carrier to which the base station discovered by the network discovery belongs. The "center frequency#N" indicates a frequency used at the time of performing wireless communication with a base station discovered by the network discovery. The "bandwidth#N" indicates a bandwidth of a frequency band used at the time of performing wireless communication with a base station discovered by the network discovery.

In this regard, in the example shown in FIG. 9, the "BSID#N", the "NAP-ID#N", the "NSP-ID#N", the "center frequency#N", and the "bandwidth#N" that have a same number "N" are assumed to be related. For example, the "BSID#1", the "NAP-ID#1", the "NSP-ID#1", the "center frequency#1", and the "bandwidth#1" are related.

Processing Sequence by Wireless Communication System Cccording to First Embodiment Next, a description will be given of a processing sequence of the wireless communication system SY1 according to a first embodiment using FIGS. 10 and 11. FIGS. 10 and 11 are sequence diagrams illustrating a processing procedure by the wireless communication system SY1 according to the first embodiment. In this regard, in FIGS. 10 and 11, a description will be given of a processing sequence among the connection management unit 111 in the host computer unit 110, the abnormality processing unit 140, the communication control unit 132 in the wireless communication unit 130, and the base station 10. Also, in FIGS. 10 and 11, one base station 10 is illustrated. There are cases where the base station 10 like this indicates a plurality of such base stations.

FIG. 10 illustrates processing from a start of the wireless communication unit 130 to normal communication processing between the wireless communication unit 130 and the base station 10. As shown in FIG. 10, when the wireless communication unit 130 is started (step S101), the communication control unit 132 performs initialization processing of the wireless communication unit 130 (step S102). For example, when coupled to the host computer unit 110 using a USB, etc., the wireless communication unit 130 is started at the time of coupled to the host computer unit 110. Also, for example, if the wireless communication unit 130 is included in the host computer unit 110, the wireless communication unit 130 is started after the user has operated to perform wireless communication.

Next, the communication control unit 132 transmits an initialization completion notification to the connection management unit 111 through the abnormality processing unit 140 (step S103). For example, the communication control unit 132 transmits a state notification, shown in FIG. 9, in which "0×0" is set in the "notification type", to the connection management unit 111.

The connection management unit 111 that has received the initialization completion notification transmits a network-discovery execution instruction to the communication control unit 132 through the abnormality processing unit 140 (step S104). For example, the connection management unit 111 transmits the network-discovery execution instruction exemplified in FIG. 5 to the communication control unit 132.

The communication control unit 132 that has received the network-discovery execution instruction performs network discovery on the basis of a combination of a center frequency and a bandwidth included in the network-discovery execution instruction (step S105). And after the network discovery has been completed, the communication control unit 132 transmits a discovery completion notification to the connection management unit 111 (step S106). For example, the communication control unit 132 transmits the discovery completion notification shown in FIG. 9 to the connection management unit 111.

The connection management unit 111 that has received a discovery completion notification selects a base station of the other end of communication on the basis of the various kinds of information included in the discovery completion notification. And the connection management unit 111 transmits a network-entry execution instruction including a BSID, etc., of the selected base station to the communication control unit 132 (step S107). For example, the connection management unit 111 transmits the network-entry execution instruction exemplified in FIG. 6 to the communication control unit 132.

The communication control unit 132 that has received the network-entry execution instruction performs network entry on the basis of a combination of a center frequency and a bandwidth included in the network-entry execution instruction (step S108). And after the network entry is complete, the communication control unit 132 transmits a connection completion notification to the connection management unit 111 (step S109). For example, the communication control unit 132 transmits a state notification in which "0×2" is set in the notification type shown in FIG. 9 to the connection management unit 111.

Thereby, the mobile station 100 goes into a state capable of wireless communication with the base station 10, and thus the communication control unit 132 and the connection management unit 111 become a "normal operation" state (steps S110 and S111).

And the abnormality processing unit 140 stores various connection parameters obtained by the network discovery in step S105 and the network entry in step S108 into the connection-parameter storage unit 150 (step S112). Specifically, the abnormality processing unit 140 can obtain an execution result of the network discovery in step S106 from the communication control unit 132, and can obtain an execution result of the network entry in step S109. At this time the abnormality processing unit 140 stores the execution result of the network discovery and the execution result of the network entry into the connection-parameter storage unit 150.

In this regard, after S106, the abnormality processing unit 140 may store various connection parameters obtained by the execution result by the network discovery to the connection-parameter storage unit 150. Also, not the abnormality processing unit 140, but the communication control unit 132 may store the various connection parameters into the connection-parameter storage unit 150.

Next, the connection management unit 111 transmits a received-power-report execution instruction to the communication control unit 132 through the abnormality processing unit 140 (step S113). For example, the connection management unit 111 transmits the received-power-report execution instruction exemplified in FIG. 7 to the communication control unit 132. When the abnormality processing unit 140 receives a received-power-report execution instruction from the connection management unit 111, the abnormality processing unit 140 starts a response monitoring timer (step S114).

The communication control unit 132 that has received the received-power-report execution instruction measures a radio wave intensity of a signal received from a neighboring base station on the basis of a combination of the report-target BS included in the received-power-report execution instruction and the report metric (step S115). And after the measurement processing of a radio wave intensity is complete, the communication control unit 132 transmits a received-power-report response to the connection management unit 111 through the abnormality processing unit 140 (step S116). For example, the communication control unit 132 transmits the received-power-report response exemplified in FIG. 8 to the connection management unit 111.

When the abnormality processing unit 140 receives the received-power report response from the connection management unit 111, the abnormality processing unit 140 updates the received power of the connection-parameter storage unit 150 on the basis of the report-target BS and the report result included in the received-power report response (step S117). And when the abnormality processing unit 140 receives the received-power report response from the connection management unit 111, the abnormality processing unit 140 stops the response monitoring timer that was started in step S114 (step S118). In this regard, the connection management unit 111 periodically transmits a received-power-report execution instruction to the communication control unit 132. That is to say, the processing procedures from step S113 to S118 are performed periodically.

In this manner, the abnormality processing unit 140 monitors the wireless communication unit 130 using the received-power-report execution instructions and the received-power-report responses that are periodically transmitted and received between the connection management unit 111 and the communication control unit 132. To put it another way, the abnormality processing unit 140 uses the received-power-report execution instructions and the received-power-report responses as "keep alive" to the wireless communication unit 130. And when the abnormality processing unit 140 does not receive a received-power-report response from the communication control unit 132 for a certain period of time in response to a received-power-report execution instruction periodically transmitted to the communication control unit 132, the abnormality processing unit 140 determines that an abnormality has occurred in the wireless communication unit 130.

In this regard, the abnormality processing unit 140 may use a message other than a received-power-report execution instruction and a received-power report as "keep alive" to the wireless communication unit 130. Specifically, the abnormality processing unit 140 can use a message periodically transmitted and received between the connection management unit 111 and the communication control unit 132 as "keep alive" to the wireless communication unit 130. For example, when the connection management unit 111 performs polling a received-power measurement result from the communication control unit 132, the abnormality processing unit 140 may determine whether an abnormality has occurred or not in the abnormality processing unit 140 on the basis of such a polling result.

Next, when the communication control unit 132 determines to perform wireless communication with a base station other than the base station with which wireless communication is currently performed as a result of measuring a radio wave intensity of a signal received from a plurality of neighboring base stations, the communication control unit 132 performs handover (step S119). At this time, the communication control unit 132 transmits an in-process-of HO notification to the connection management unit through the abnormality processing unit 140 (step S120). For example, the communication control unit 132 transmits a state notification in which "0×3" is set in the "notification type" shown in FIG. 9 to the connection management unit 111.

And the communication control unit 132 goes into a handover state performing handover processing (step S121). In the same manner, the connection management unit 111 that has received an in-process-of HO notification goes into a handover state (step S122). The connection management unit 111 in a handover state recognizes that handover is being performed by the communication control unit 132, and stops transmission of a data message to the data transmission/receiving unit 133.

And the communication control unit 132 performs "network reentry" coupling with a new base station as a result of the handover (step S123). After the network reentry is complete, the communication control unit 132 transmits a connection completion notification to the connection management unit 111 through the abnormality processing unit 140 (step S124).

Thereby, the mobile station 100 becomes a state capable of performing wireless communication with a new base station, and thus the communication control unit 132 and the connection management unit 111 go into a "normal operation" state (step S125 and S126).

And the abnormality processing unit 140 overwrites various connection parameters obtained by the network reentry in step S123 into the connection-parameter storage unit 150 (step S127). Specifically, the abnormality processing unit 140 obtains an execution result of the network reentry in step S124 from the communication control unit 132, and stores the obtained execution result into the abnormality processing unit 140.

In this manner, the mobile station 100 performs wireless communication with a base station, and executes handover depending on the situation. And the mobile station 100 stores various connection parameters obtained by a network discovery, a network entry, and a network reentry into the connection-parameter storage unit 150.

Next, with reference to FIG. 11, a description will be given of a processing sequence by the wireless communication system SY1 in the case where an abnormality is detected in the wireless communication unit 130 of the mobile station 100 after the mobile station 100 and the base station 10 are coupled. In the example shown in FIG. 11, it is assumed that the initial states of the baseband processing unit 131 and the operating system unit 112 are "normal operation".

As shown in FIG. 11, the connection management unit 111 periodically transmits a received-power-report execution instruction to the communication control unit 132 through the abnormality processing unit 140 (step S201). When the abnormality processing unit 140 receives a received-power-report execution instruction from the connection management unit 111, the abnormality processing unit 140 starts the response monitoring timer (step S202).

Here, it is assumed that the abnormality processing unit 140 does not receive a received-power report response from the communication control unit 132 even if a certain period of time has passed since the start of the response monitoring timer in step S202. In such a case, the abnormality processing unit 140 detects that an abnormality occurred in the wireless communication unit 130 (step S203). And when the abnormality processing unit 140 has detected an abnormality of the wireless communication unit 130, the abnormality processing unit 140 becomes a blocking mode, and does not relay various execution instructions and messages that are transmitted and received between the connection management unit 111 and the communication control unit 132 (step S204).

Further, the abnormality processing unit 140 notifies the baseband processing unit 131 that the wireless communication unit 130 is normal, but is temporarily in a state that cannot be used. In the example shown in FIG. 11, the abnormality processing unit 140 transmits an in-process-of HO notification to the connection management unit 111 (step S205). For example, the abnormality processing unit 140 transmits a state notification in which "0×3" is set in the "notification type" shown in FIG. 9 to the connection management unit 111. In this regard, the abnormality processing unit 140 may transmit not an in-process-of HO notification, but may transmit an in-process-of scan notification to the connection management unit 111. In such a case, the abnormality processing unit 140 transmits a state notification in which "0×4" is set in the "notification type" shown in FIG. 9 to the connection management unit 111.

The connection management unit 111 that has received the in-process-of HO notification goes into a handover state (step S206). That is to say, the connection management unit 111 determines that the wireless communication unit 130 is normal, because the abnormality processing unit 140 conceals an abnormality of the wireless communication unit 130. Thereby, the connection management unit 111 does not give an initialization instruction, a network-discovery execution instruction, and a network-entry execution instruction to the wireless communication unit 130 even if an abnormality occurs in the wireless communication unit 130. Also, the connection management unit 111 recognizes that the wireless communication unit 130 is temporarily in a state that cannot be used, the connection management unit 111 stops transmission of a data message to the data transmission/receiving unit 133.

And the abnormality processing unit 140 transmits a reset signal to the communication control unit 132 (step S207). The communication control unit 132 that has received the reset signal initializes the wireless communication unit 130 (step S208). And the communication control unit 132 transmits an initialization completion notification to the abnormality processing unit 140 after the initialization processing of the wireless communication unit 130 is complete (step S209).

The abnormality processing unit 140 that has received the initialization completion notification obtains various connection parameters from the connection-parameter storage unit 150, and transmits the obtained connection parameters to the communication control unit 132 (step S210). For example, the abnormality processing unit 140 loads the various connection parameters obtained from the connection-parameter storage unit 150 into a memory in the wireless communication unit 130.

And the abnormality processing unit 140 transmits a network-reentry execution instruction indicating that a reconnection should be made to the base station that had been coupled with the communication control unit 132 immediately before an abnormality of the wireless communication unit 130 occurred to the communication control unit 132 (step S211).

And the communication control unit 132 performs network reentry using the various connection parameters stored in the connection-parameter storage unit 150 (step S212). That is to say, the communication control unit 132 is recoupled to the base station that it had been coupled to before an abnormality of the wireless communication unit 130 occurred. And the communication control unit 132 transmits a connection completion notification to the connection management unit 111 after the network reentry is complete (step S213). And the communication control unit 132 goes into a state enabling wireless communication with the base station 10, and thus becomes a "normal operation" state (step S214).

The abnormality processing unit 140 that has received the connection completion notification cancels the blocking mode, and relays various execution instructions transmitted and received between the connection management unit 111 and the communication control unit 132 (step S215). And the abnormality processing unit 140 transmits a connection completion notification to the connection management unit 111 (step S216).

The connection management unit 111 that has received the connection completion notification becomes a "normal operation" state (step S217). The connection management unit 111 that has become the "normal operation" state retransmits a data message to the data transmission/receiving unit 133.

Also, the abnormality processing unit 140 overwrites the various connection parameters obtained by the network reentry in step S212 into the connection-parameter storage unit 150 (step S218). Specifically, the abnormality processing unit 140 can obtain the execution result of the network reentry from the communication control unit 132 in step S213. At this time the abnormality processing unit 140 stores the execution result of the network reentry into the connection-parameter storage unit 150.

In this regard, the abnormality processing unit 140 may perform the state notification processing in S205 and the reset-signal transmission processing in S207 at the same time. Alternatively, the abnormality processing unit 140 may perform the reset-signal transmission processing in S205 immediately after the state notification processing in S207.

Figure 12:
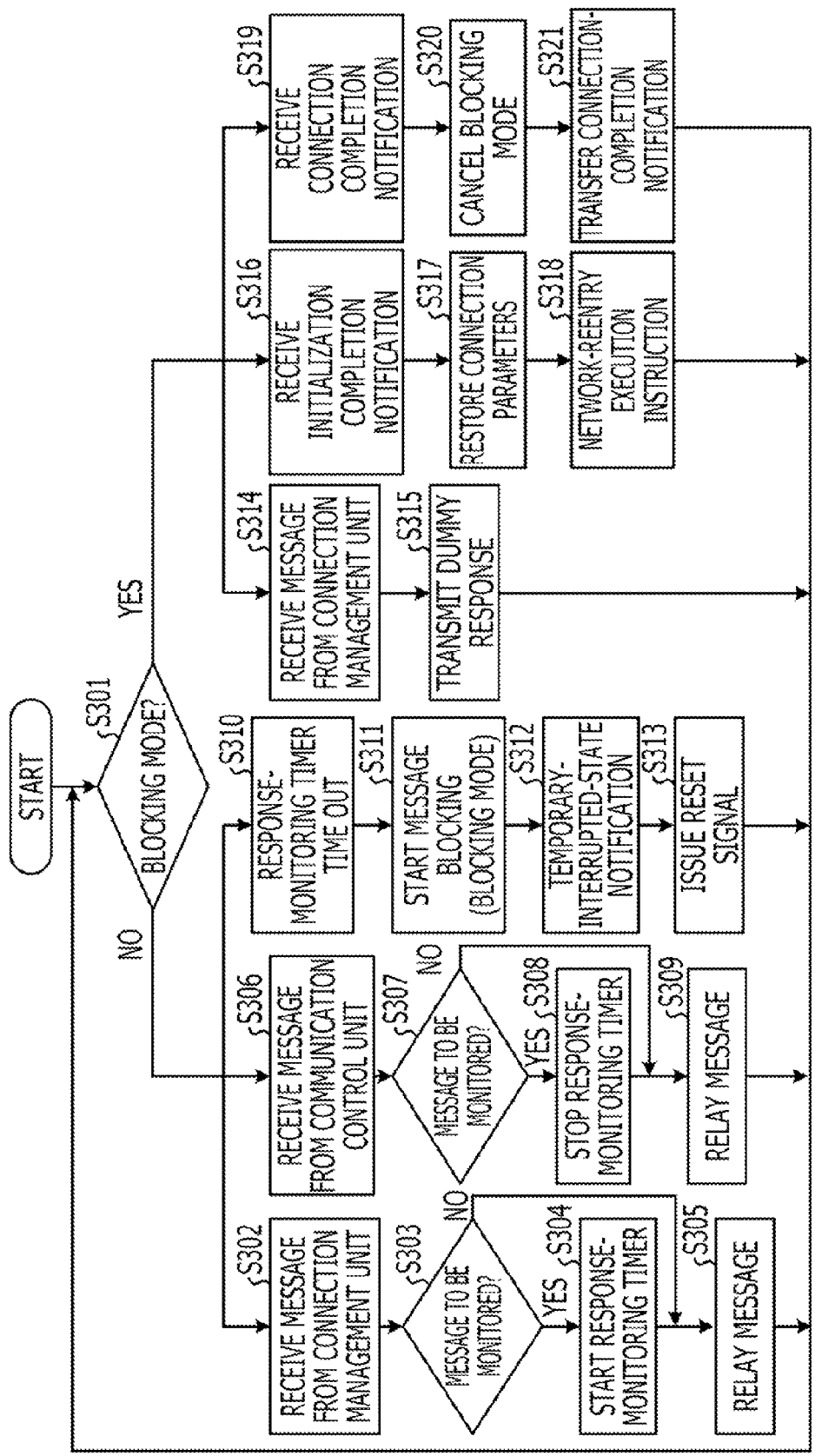
FIG. 12 is a flowchart illustrating a processing procedure by an abnormality processing unit.

Processing Procedure by Abnormality Processing Unit According to First Embodiment Next, a description will be given of a processing procedure by the abnormality processing unit 140 using FIG. 12. FIG. 12 is a flowchart illustrating a processing procedure performed by the abnormality processing unit 140. As shown in FIG. 12, the abnormality processing unit 140 is divided into two states, namely, whether it is in a blocking mode or not.

When the abnormality processing unit 140 is not in the blocking mode (negation in step S301), an event receiving a message from the connection management unit 111 and the communication control unit 132, and an event causing time out of the response monitoring timer, etc., occur.

Specifically, when the abnormality processing unit 140 receives a message from the connection management unit 111 (step S302), the abnormality processing unit 140 determines whether the message is a monitor-target message or not (step S303). And if the message received from the connection management unit 111 is the monitor-target message (affirmation in step S303), the abnormality processing unit 140 starts the response monitoring timer (step S304). And the abnormality processing unit 140 relays the message received from the connection management unit 111 to the communication control unit 132 (step S305). On the other hand, if the message received from the connection management unit 111 is not a monitor-target message (negation in step S303), the abnormality processing unit 140 does not start the response monitoring timer, and relays the message to the communication control unit 132 (step S305).

For example, in the examples shown in FIG. 10 and FIG. 11, the abnormality processing unit 140 determines the received-power-report execution instruction to be a monitor-target message. In such an example, when the abnormality processing unit 140 receives a received-power-report execution instruction from the connection management unit 111, the abnormality processing unit 140 starts the response monitoring timer.

Also, if the abnormality processing unit 140 receives a message from the communication control unit 132 (step S306), the abnormality processing unit 140 determines whether that message is a monitor-target message or not (step S307). And if a message received from the communication control unit 132 is the monitor-target message (affirmation in step S307), the abnormality processing unit 140 stops the response monitoring timer (step S308). And the abnormality processing unit 140 relays the message received from the communication control unit 132 to the connection management unit 111 (step S309). On the other hand, if the message received from the communication control unit 132 is not a monitor-target message (negation in step S307), the abnormality processing unit 140 does not stop the response monitoring timer, but relays the message to the connection management unit 111 (step S309).

For example, in the examples shown in FIGS. 10 and 11, the abnormality processing unit 140 determines the received-power-report response to be a monitor-target message. In such an example, when the abnormality processing unit 140 receives a received-power-report response from the communication control unit 132, the abnormality processing unit 140 stops the response monitoring timer.

Also, even if a certain period of time has passed since the response monitoring timer is started, when the abnormality processing unit 140 does not receive a monitor-target message from the communication control unit 132 (step S310), the abnormality processing unit 140 becomes a blocking mode (step S311). And the abnormality processing unit 140 notifies the connection management unit 111 that the wireless communication unit 130 is temporarily in an interrupted state (step S312). And the abnormality processing unit 140 transmits a reset signal to the communication control unit 132 (step S313).

Next, when the abnormality processing unit 140 is in the blocking mode (affirmation in step S301), an event receiving a message from the connection management unit 111 and the communication control unit 132, etc., occur.

Specifically, when the abnormality processing unit 140 receives a message from the connection management unit 111 (step S314), the abnormality processing unit transmits a dummy response to the connection management unit 111 in place of the communication control unit 132 because of the blocking mode (step S315).

Also, when the abnormality processing unit 140 receives an initialization completion notification from the communication control unit 132 (step S316), the abnormality processing unit 140 transfers the connection parameters stored in the connection-parameter storage unit 150 to the communication control unit 132 so as to restore the connection parameters (step S317). And the abnormality processing unit 140 transmits a network-reentry execution instruction indicating that a reconnection should be made to the base station that has been coupled with the communication control unit 132 immediately before an abnormality of the wireless communication unit 130 is detected to the communication control unit 132 (step S318).

Also, when the abnormality processing unit 140 receives a connection completion notification from the communication control unit 132 (step S319), the abnormality processing unit 140 cancels the blocking mode (step S320). And the abnormality processing unit 140 transfers the connection completion notification received from the communication control unit 132 to the connection management unit 111 (step S321).

Effect of First Embodiment

As described above, in a mobile station 100 according to the first embodiment, an abnormality of the wireless communication unit 130 is concealed from the connection management unit 111, and thus the host computer unit 110 determines that the wireless communication unit 130 is normal. Accordingly, the operating system unit 112 of the host computer unit 110 does not re-create the communication port 114 and the logical interface unit 112a even if the wireless communication unit 130 performs initialization processing. That is to say, even if an abnormality occurs in the wireless communication unit 130, it is possible to recognize the communication port 114 and the logical interface unit 112a, and thus the communication application unit 113 does not terminate a communication session with the base station. Thereby, in the mobile station 100 according to the first embodiment, when an abnormality that is canceled by resetting the wireless communication unit 130, it is possible to prevent informing the user that the wireless communication has been interrupted.

Also, in a mobile station 100 according to the first embodiment, connection parameters on a connection established between the wireless communication unit 130 and the base station 10 are stored in the connection-parameter storage unit 150. And when an abnormality occurs in processing by the wireless communication unit 130, the abnormality processing unit 140 of the mobile station 100 stops the connection management unit 111 to control the wireless communication unit 130. Thereby, even if an abnormality occurs in the wireless communication unit 130, the mobile station 100 can prevent the connection management unit 111 from giving an initialization instruction, a network-discovery execution instruction, and a network-entry execution instruction to the wireless communication unit 130.

Also, when an abnormality occurs in the processing by the wireless communication unit 130, the abnormality processing unit 140 of the mobile station 100 controls the wireless communication unit 130 so as to initialize the wireless communication unit 130, and then to perform network reentry using the connection parameters in the connection-parameter storage unit 150. Thereby, even if an abnormality is detected in the wireless communication unit 130, the mobile station 100 can re-couple to the base station in a short time without performing network discovery, and thus restart communication with the base station in a short time.

As described above, it is possible for a mobile station 100 according to the first embodiment to improve availability of wireless communication. In particular, in a wireless communication system, such as WiMAX and LTE, the wireless communication standards have become complicated, and thus complicated processing is performed between the wireless terminal apparatus and the base station. Accordingly, in recent years, in a wireless communication system, a wireless communication state between the wireless terminal apparatus and the base station often becomes unstable. As a result, it is thought that it becomes necessary to reset a modem of a wireless terminal apparatus more frequently. In a wireless communication system SY1 according to the first embodiment, even in the case where a communication standard, such as WiMAX or LTE, is applied, it is possible to improve availability of wireless communication as described above.

Also, in the abnormality processing unit 140 of the mobile station 100, if an abnormality occurs in processing by the wireless communication unit 130, an in-process-of HO notification indicating that the wireless communication unit 130 is performing handover processing is notified to the connection management unit 111. Alternatively, the abnormality processing unit 140 gives an in-process-of scan notification indicating that the wireless communication unit 130 is performing scan processing to the connection management unit 111. Thereby, it is possible for the mobile station 100 to temporarily stop the host computer unit 110 from transmitting data to the wireless communication unit 130 by using the existing state notification.

Second Embodiment

In the above-described first embodiment, an example has been described of the case where the mobile station 100 detects an abnormality of the wireless communication unit 130. However, a base station performing wireless communication with the mobile station 100 may detect an abnormality of the wireless communication unit 130. Thus, in a second embodiment, a description will be given of the case where a base station detects an abnormality of the wireless communication unit 130. In this regard, an example of a configuration of a wireless communication system SY2 according to the second embodiment is the same as the example of the configuration shown in FIG. 1, and thus the description thereof will be omitted hereinafter. Also, a mobile station according to the second is the same as the mobile station 100 according to the first embodiment, the description thereof will be omitted hereinafter.

Configuration of Base Station According to Second Embodiment

Figure 13:
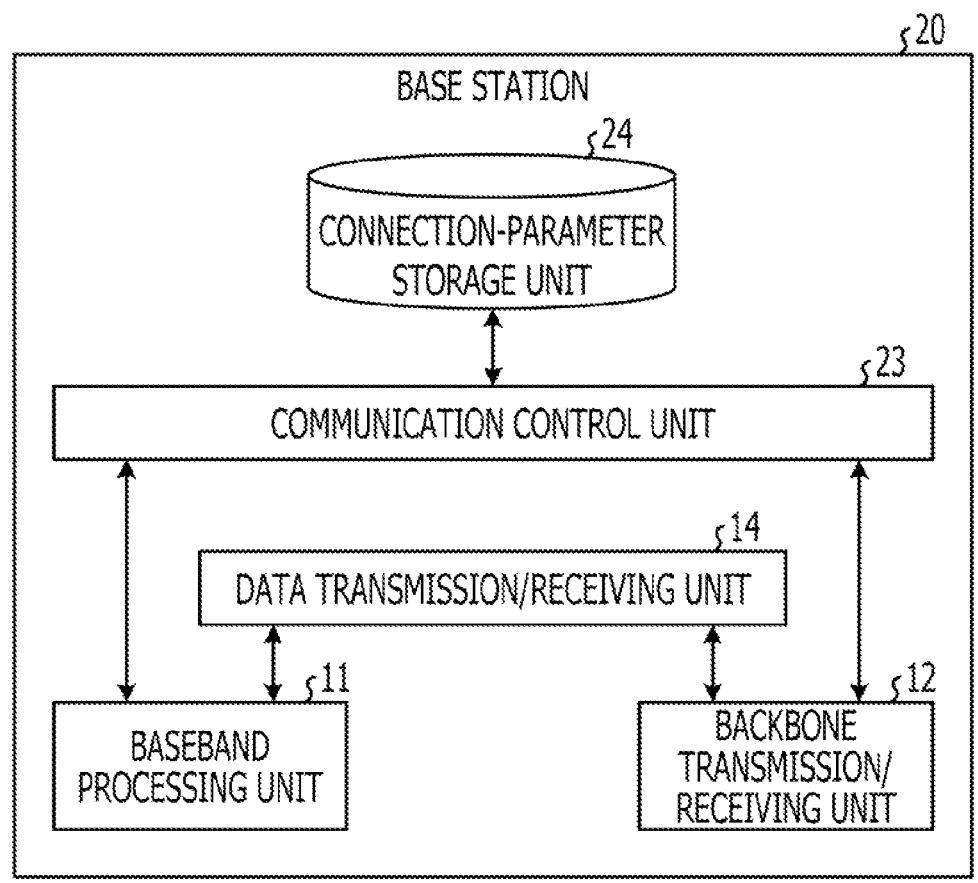
FIG. 13 is a diagram illustrating an example of a configuration of a base station according to a second embodiment.

First, a description will be given of a base station 20 according to a second embodiment using FIG. 13. FIG. 13 is a diagram illustrating an example of a configuration of the base station 20 according to the second embodiment. As shown in FIG. 13, the base station 20 according to the second embodiment has a baseband processing unit 11, a backbone transmission/receiving unit 12, a data transmission/receiving unit 14, a communication control unit 23, and a connection-parameter storage unit 24. In this regard, hereinafter, a same reference numeral is given to a part having a same function as a component shown in FIG. 2, and a detailed description thereof is omitted.

In the same manner as the communication control unit 13 shown in FIG. 2, the communication control unit 23 transmits and receives control messages between the mobile station 100 and the ASN-GW 3a so as to control wireless communication with the mobile station 100. Also, when a connection is established between the base station 20 and the mobile station 100, the communication control unit 23 according to the second embodiment stores the connection parameters on the connection established between the base station 20 and the mobile station 100 into the connection-parameter storage unit 24.

Also, when the communication control unit 23 has detected an abnormality of the wireless communication unit 130 held by the mobile station 100 after coupled to the mobile station 100, the communication control unit 23 instructs the mobile station 100 to initialize the wireless communication unit 130. For example, if the communication control unit 23 has failed to receive an expected control message from the mobile station 100 in response to a control message transmitted to the mobile station 100, the communication control unit 23 detects that inconsistency has occurred between a state of the mobile station 100 and a state of the base station 20. In such a case, the communication control unit 23 determines that an abnormality has occurred in the wireless communication unit 130 of the mobile station 100, and instructs the mobile station 100 to initialize the wireless communication unit 130.

The mobile station 100 that has received an initialization instruction of the wireless communication unit 130 from the communication control unit 23 initializes the wireless communication unit 130, and performs network reentry. In such a case, the communication control unit 23 restarts communication with the mobile station 100 using the connection parameters stored in the connection-parameter storage unit 24.

The connection-parameter storage unit 24 stores the connection parameters on the connection established between the base station 20 and the mobile station 100. For example, the connection-parameter storage unit 24 stores information, such as "NAP-ID", "NSP-ID", "DCD parameter", "UCD parameter", "RNG parameter", "SBC parameter", "PKM parameter", and "REG parameter" shown in FIG. 4.

Figure 14:
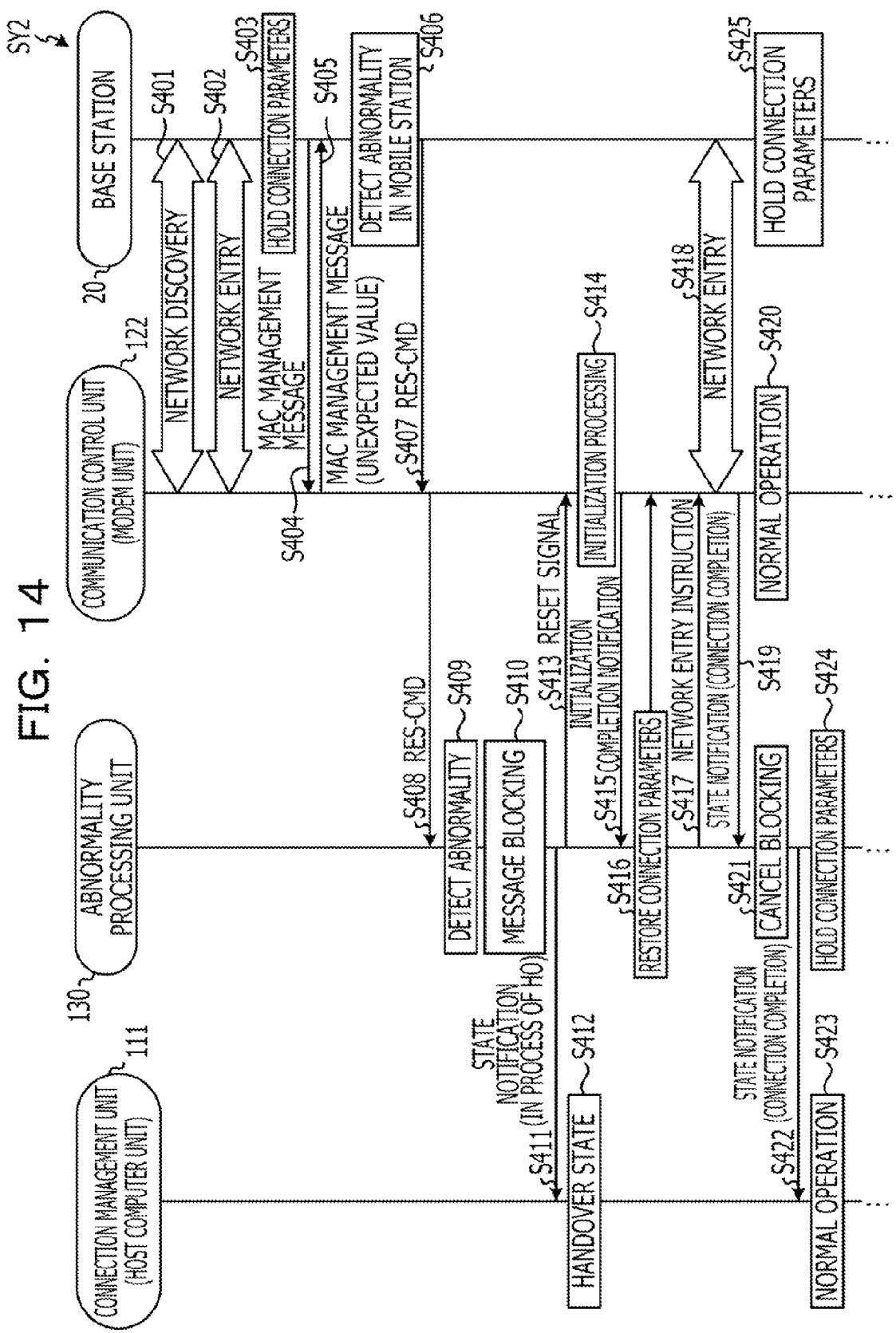
FIG. 14 is a sequence chart illustrating a processing procedure by the wireless communication system according to the second embodiment.

Processing Sequence by Wireless Communication System According to Second Embodiment Next, a description will be given of a processing sequence by a wireless communication system SY2 according to a second embodiment using FIG. 14. FIG. 14 is a sequence chart illustrating a processing procedure by the wireless communication system SY2 according to the second embodiment.

As shown in FIG. 14, when the mobile station 100 couples to the base station 20, the mobile station 100 performs network discovery (step S401), and performs network entry (step S402). At this time, the base station 20 stores the various connection parameters obtained by the network entry in step S402 into the connection-parameter storage unit 24 (step S403).

And after coupled to the mobile station 100, the base station 20, for example, transmits an "MAC management message" to the mobile station 100 (step S404). At this time, if the base station 20 receives an unexpected "MAC management message" from the mobile station 100 (step S405), the base station 20 detects an abnormality of the wireless communication unit 130 held by the mobile station 100 (step S406). In this regard, if the base station 20 has detected inconsistency other than an "MAC management message" in a protocol sequence performed with the mobile station 100, the base station 20 detects an abnormality of the wireless communication unit 130.

When the base station 20 has detected an abnormality of the wireless communication unit 130, the base station 20 transmits an RES-CMD message indicating to reset the wireless communication unit 130 to the mobile station 100 (step S407).

The communication control unit 132 of the mobile station 100 that has received the RES-CMD message transmits an RES-CMD message to the abnormality processing unit 140 (step S408). When the abnormality processing unit 140 receives the RES-CMD message, the abnormality processing unit 140 detects that an abnormality has occurred in the wireless communication unit 130 (step S409). The processing procedure of steps S410 to S424 after that is the same as the processing procedure of steps S204 to S218 shown in FIG. 11.

Here, in step S418, if the communication control unit 132 has performed network reentry, the base station 20 establishes a connection with the mobile station 100 using the connection parameters stored in the connection-parameter storage unit 24.

Effect of Second Embodiment

As described above, a base station 20 according to the second embodiment stores the connection parameters on a connection established with the mobile station 100 into the connection-parameter storage unit 24. And when the wireless communication unit 130 held by the mobile station 100 has detected an abnormality, the base station 20 instructs the mobile station 100 to initialize the wireless communication unit 130. In such a case, in the same manner as the first embodiment, the mobile station 100 conceals that the wireless communication unit 130 is abnormal from the connection management unit 111, and then performs network reentry using the connection parameters stored in the connection-parameter storage unit 150. When the mobile station 100 performs network reentry, a base station 20 according to the second embodiment establishes a connection with the mobile station 100 using the connection parameters stored in the connection-parameter storage unit 24.

Thereby, when the base station 20 detects an abnormality in the wireless communication unit 130 held by the mobile station 100, the base station 20 is allowed to re-couple to the mobile station 100 without performing network discovery. As a result, it is possible for a base station 20 according to the second embodiment to re-establish communication with the mobile station 100 in a short time, and to improve availability of wireless communication.

Third Embodiment

Incidentally, a wireless communication apparatus, a wireless terminal apparatus, a wireless base station, and an abnormality restoration method, etc., disclosed in the present application may be implemented in various different embodiments other than the above-described embodiments. Thus, in a third embodiment, a description will be given of a wireless communication apparatus, a wireless terminal apparatus, a wireless base station, and an abnormality restoration method, etc., according to the other embodiments disclosed in the present application.

Network Reentry

In the above-described embodiments, the mobile station 100 may couple to a base station other than the base station to which the mobile station 100 has been coupled before an abnormality occurs in the wireless communication unit 130 when performing network reentry using the connection parameters stored in the connection-parameter storage unit 150. Specifically, various kinds of information on a plurality of neighboring base stations located in the neighborhood of the mobile station 100 are stored in the connection-parameter storage unit 150. Thus, the mobile station 100 may select any one of the plurality of neighboring base stations stored in the connection-parameter storage unit 150, and may perform network reentry on the selected neighboring base station. For example, the mobile station 100 may perform network reentry on a neighboring base station having a highest received power stored in the connection-parameter storage unit 150.

Hardware Configuration

Also, it is also possible to create a program produced by describing the processing performed by a wireless terminal apparatus according to each of the above-described embodiments using a computer-executable language. In this case, a computer performs the program so that the same effects as those of the above-described embodiments can be obtained. Further, the above-described program may be recorded on a computer-readable recording medium, and the same processing as that of each the above-described embodiment may be achieved by reading the program recorded on the recording medium into the computer, and executing the program.

Figure 15:
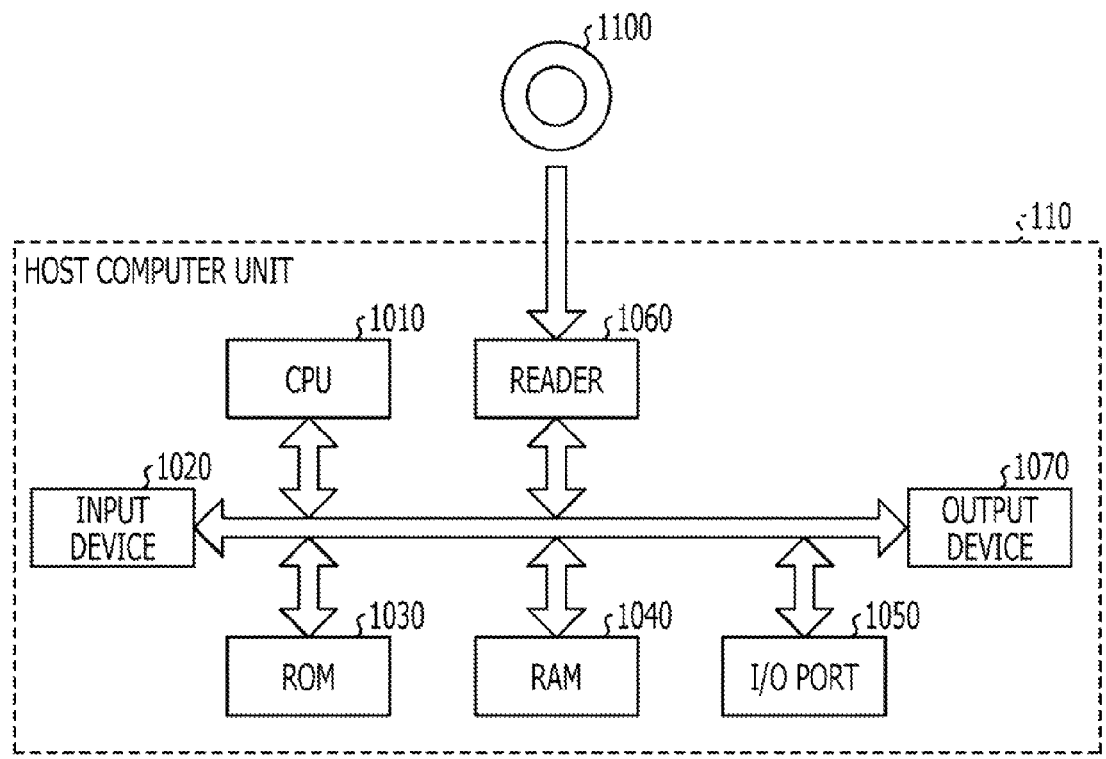
FIG. 15 is a diagram illustrating an example of a hardware configuration of a host computer unit illustrated in FIG. 3.

FIG. 15 is a diagram illustrating an example of a hardware configuration of the host computer unit 110 shown in FIG. 3. As shown in FIG. 15, the host computer unit 110 includes a CPU 1010, an input device 1020, a ROM 1030, a RAM 1040, an I/O port 1050, a reader 1060, and an output device 1070.

The CPU 1010 executes a host program that performs processing by the above-described host computer unit 110. The input device 1020 inputs data. The ROM 1030 stores various kinds of data. The RAM 1040 stores calculation parameters, etc. The I/O port 1050 transmits and receives data between the CPU 1010 and peripherals. The reader 1060 reads the host program from a recording medium 1100 on which the host program is recorded. The output device 1070 displays various kinds of information, and is a display unit, etc., for example.

The CPU 1010 reads the host program recorded on the recording medium 1100 through the reader 1060, and then executes the host program so as to achieve processing by the above-described host computer unit 110. In this regard, the recording medium 1100 includes an optical disc, a flexible disk, a CD-ROM, a hard disk, etc. Also, the host program may be installed onto the wireless communication unit 130 through a network. At this time, the network may be a wireless network or a wired network.

Figure 16:
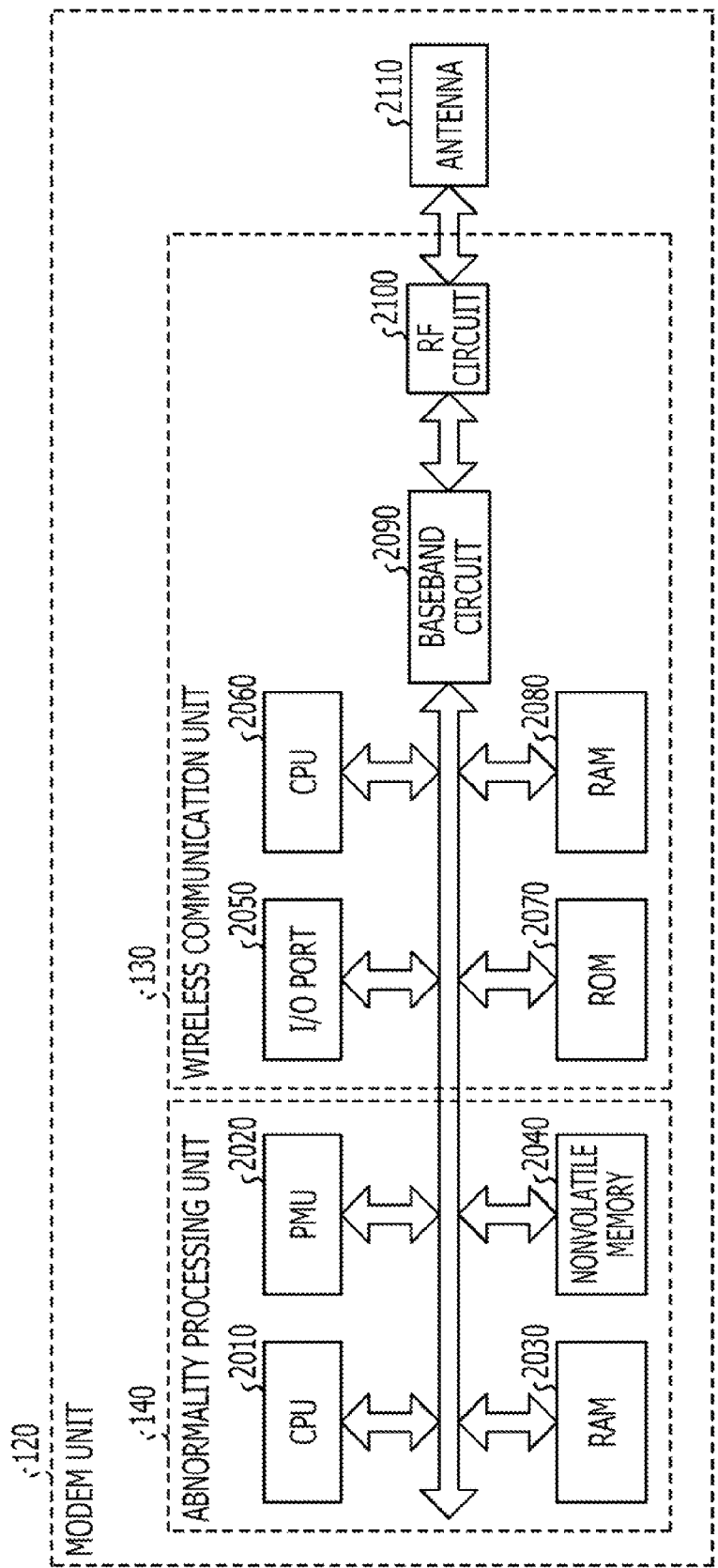
FIG. 16 is a diagram illustrating an example of a modem unit illustrated in FIG. 3.

FIG. 16 is a diagram illustrating an example of a hardware configuration of the modem unit 120 shown in FIG. 3. As described above, the modem unit 120 includes the wireless communication unit 130, and the abnormality processing unit 140. As shown in FIG. 16, the abnormality processing unit 140 includes a CPU 2010, a PMU (Power Management Unit) 2020, a RAM 2030, and a nonvolatile memory 2040.

The CPU 2010 executes an abnormality processing program achieving processing by the above-described abnormality processing unit 140. The PMU 2020 is a power management unit supplying power to the abnormality processing unit 140. The RAM 2030 stores a calculation parameter, etc. The nonvolatile memory 2040 stores various kinds of data, and stores, for example, the abnormality processing program. Also, the nonvolatile memory 2040 stores the various connection parameters stored in the connection-parameter storage unit 150 shown in the FIG. 3.

Also, as shown in FIG. 16, the wireless communication unit 130 includes an I/O port 2050, a CPU 2060, a ROM 2070, a RAM 2080, a baseband circuit 2090, and an RF circuit 2100. Also, the RF circuit 2100 is coupled to an antenna 2110.

The I/O port 2050 transmits and receives data between the CPU 2060 and the peripherals. The CPU 2060 executes a communication program that performs processing by the communication control unit 132 and the data transmission/receiving unit 133, shown in FIG. 3. The ROM 2070 stores various kinds of data, and stores, for example, a communication program. The RAM 2080 stores calculation parameters, etc. The baseband circuit 2090 and the RF circuit 2100 correspond to the baseband processing unit 131 shown in FIG. 3.

In the example shown in FIG. 16, even if the wireless communication unit 130 is initialized, the abnormality processing unit 140 is subjected to power management independently by the PMU 2020, and is not reset. On the other hand, when initialization processing is performed, the wireless communication unit 130 is reset. Accordingly, for example, various kinds of information stored in the RAM 2080, etc., may be cleared.

The base station 10 shown in FIG. 2 or the base station 20 shown in FIG. 13 includes at least a wireless interface, a processor, and a memory.

System Configuration, etc.

Also, each component of the apparatus shown in the figure is a functional and conceptual unit, and thus is not necessarily configured physically as shown in the figure. That is to say, a specific configuration of separation and integration of each apparatus is not limited to the configuration that is shown in the figure. It is possible to configure all of or a part of the apparatuses by functionally and physically distributing or integrating the apparatuses for any unit in accordance with various loads and use conditions, etc. For example, the abnormality processing unit 140 shown in FIG. 3 may be separated into a processing unit performing various kinds of processing when an abnormality of the wireless communication unit 130 is detected, and a storage unit storing various connection parameters into the connection-parameter storage unit 150.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile station which communicates with a base station, the mobile station comprising:
   a first processor configured to perform wireless communication with the base station by wireless communication interface;
   a second processor configured to determine whether an initialization of the wireless communication interface is needed;
   a third processor configured to instruct the first processor to search a base station with which the first processor is capable of communicating, in the case that the third processor recognizes that the initialization of the wireless communication interface is needed;
   a memory configured to store connection information for wirelessly coupling of the wireless communication interface with each of one or more base stations including the base station;
   wherein the second processor is further configured, when the second processor determines that the initialization of the wireless communication interface is needed, to send to the third processor a first signal indicating that the initialization of the wireless communication interface is not needed but the wireless communication interface is incapable of being used, and to send to the first processor a second signal indicating that the initialization of the wireless communication interface is needed, and the first processor is further configured to establish a connection with one of the one or more base stations based on the stored connection information after the initialization of the wireless communication interface.

2. The mobile station according to claim 1, wherein the first signal is a signal indicating that the first processor is in process of handover.

3. The mobile station according to claim 1, wherein the first signal is a signal indicating that the first processor is searching for a neighboring base station.

4. The mobile station according to claim 1, wherein after the initialization of the wireless communication interface, the first processor is further configured to input to the third processor a third signal for recognizing that the wireless communication interface is communicable to the base station.

5. The mobile station according to claims claim 1, wherein
the second processor is configured, when receiving a message from the third processor after sending the first signal, to transmit a dummy response to the third processor.

6. The mobile station according to claims claim 1, wherein
after the initialization of the wireless communication interface, the first processor is configured to recouple to the base station.

7. A system including a base station communicating with a mobile station, the system comprising:
the base station including
a memory configured to store connection information on an established connection with the mobile station; and
a fourth processor configured
to instruct, on detecting an error occurring in processing by the mobile station, the mobile station to initialize a wireless communication interface performing wireless communication processing; and
to establish a wireless connection with the mobile station using the connection information stored in the memory, and
the mobile station including
a first processor configured to perform wireless communication with the base station by the wireless communication interface;
a second processor configured to determine whether an initialization of the wireless communication interface is needed;
a third processor configured to instruct the first processor to search a base station with which the first processor is capable of communicating, in the state that the third processor recognizes that the initialization of the wireless communication interface is needed;
a memory configured to store connection information for wirelessly coupling of the wireless communication interface with each of one or more base stations including the base station;
wherein the second processor is further configured, when the second processor determines that the initialization of the wireless communication interface is needed, to send to the third processor a first signal indicating that the initialization of the wireless communication interface is not needed but the wireless communication interface is incapable of being used, and to send to the first processor a second signal indicating that the initialization of the wireless communication interface is needed, and
the first processor is further configured to establish a connection with one of the one or more base stations based on the stored connection information after the initialization of the wireless communication interface.

8. A method of recovering from an error in a mobile station, which includes a wireless communication interface performing wireless communication, the method comprising:
performing, by a first processor, wireless communication with the base station by the wireless communication interface;
determining, by a second processor, whether an initialization of the wireless communication interface is needed;
instructing, by a third processor, the first processor to search a base station with which the first processor is capable of communicating, in the case that the third processor recognizes that the initialization of the wireless communication interface is needed;
storing, in a memory, connection information for wirelessly coupling of the wireless communication interface with each of one or more base stations including the base station;
in the case that the second processor determines that the initialization of the wireless communication interface is needed, sending, by the second processor, to the third processor a first signal indicating that the initialization of the wireless communication interface is not needed but the wireless communication interface is incapable of being used, and to send to the first processor a second signal indicating that the initialization of the wireless communication interface is needed, and
establishing, by the first processor, a connection with one of the one or more base stations based on the stored connection information after the initialization of the wireless communication interface.

* * * * *